US011468115B2

United States Patent
Pearlman et al.

(10) Patent No.: US 11,468,115 B2
(45) Date of Patent: Oct. 11, 2022

(54) SYSTEMS AND METHODS FOR SCREENSHOT LINKING

(71) Applicant: rewardStyle, Inc., Dallas, TX (US)

(72) Inventors: Jason Ellis Pearlman, Lloyd Harbor, NY (US); Elias Jason Mablekos, New York, NY (US); Andrew Cummins, Brooklyn, NY (US)

(73) Assignee: rewardStyle, Inc., Dallas, TX (US)

( * ) Notice: Subject to any disclaimer, the term of this patent is extended or adjusted under 35 U.S.C. 154(b) by 0 days.

(21) Appl. No.: 17/327,474

(22) Filed: May 21, 2021

(65) Prior Publication Data

US 2021/0390135 A1    Dec. 16, 2021

Related U.S. Application Data

(63) Continuation of application No. 16/989,573, filed on Aug. 10, 2020, which is a continuation of application
(Continued)

(51) Int. Cl.
*G06F 16/51* (2019.01)
*G06F 16/583* (2019.01)
(Continued)

(52) U.S. Cl.
CPC ......... *G06F 16/5866* (2019.01); *G06F 16/51* (2019.01); *G06F 16/583* (2019.01);
(Continued)

(58) Field of Classification Search
None
See application file for complete search history.

(56) References Cited

U.S. PATENT DOCUMENTS

| 9,569,700 B1 * | 2/2017 | Santos | G06V 10/454 |
| 2010/0260426 A1 * | 10/2010 | Huang | G06K 9/6262 |
| | | | 707/E17.031 |

(Continued)

FOREIGN PATENT DOCUMENTS

| CN | 102509235 A | 6/2012 |
| CN | 102855273 A | 1/2013 |

(Continued)

OTHER PUBLICATIONS

"The Image Histogram" IDC Herzliya College, Aug. 23, 2014. Web. May 1, 2019. < https://web.archive.org/web/20140823205940/http://www1.idc.ac.il/toky/imageProc-10/Lectures/04_histogram_ 1 0.ppt > (Year: 2014).

(Continued)

*Primary Examiner* — Eddy Cheung
(74) *Attorney, Agent, or Firm* — Bookoff McAndrews, PLLC

(57) ABSTRACT

A system for analyzing screenshots can include a computing device including a processor coupled to a memory and a display screen configured to display content. The system can include an application stored on the memory and executable by the processor. The application can include a screenshot receiver configured to access, from storage to which a screenshot of the content displayed on the display screen captured using a screenshot function of the computing device is stored, the screenshot including an image and a predetermined marker. The application can include a marker detector configured to detect the predetermined marker included in the screenshot. The application can include a link identifier configured to identify, using the predetermined marker, a link to a resource mapped to the image included in the screenshot, the resource accessible by the computing device via the link.

20 Claims, 24 Drawing Sheets

Related U.S. Application Data

No. 15/344,342, filed on Nov. 4, 2016, now Pat. No. 10,740,387, which is a continuation of application No. 15/211,321, filed on Jul. 15, 2016, now Pat. No. 10,423,657.

(60) Provisional application No. 62/192,873, filed on Jul. 15, 2015.

(51) Int. Cl.
*G06V 10/40* (2022.01)
*G06F 16/58* (2019.01)
*G06F 16/955* (2019.01)
*G06V 10/46* (2022.01)
*G06T 1/00* (2006.01)
*H04L 67/02* (2022.01)

(52) U.S. Cl.
CPC ........ *G06F 16/9566* (2019.01); *G06T 1/0007* (2013.01); *G06V 10/40* (2022.01); *G06V 10/462* (2022.01); *H04L 67/02* (2013.01)

(56) References Cited

U.S. PATENT DOCUMENTS

| | | | |
|---|---|---|---|
| 2011/0093361 A1* | 4/2011 | Morales | G06Q 30/0603 705/26.62 |
| 2012/0246029 A1* | 9/2012 | Ventrone | G06Q 30/06 705/26.63 |
| 2012/0323738 A1* | 12/2012 | Gokturk | G06Q 30/02 705/26.63 |
| 2013/0124499 A1 | 5/2013 | Liau | |
| 2013/0148882 A1 | 6/2013 | Lee | |
| 2013/0259297 A1 | 10/2013 | Knudson | |
| 2014/0089145 A1 | 3/2014 | Sunkada | |
| 2014/0176733 A1 | 6/2014 | Drooker | |
| 2014/0286542 A1 | 9/2014 | Aller | |
| 2015/0227557 A1 | 8/2015 | Holzschneider | |
| 2015/0235297 A1 | 8/2015 | Cheung | |
| 2016/0139777 A1* | 5/2016 | Pinho | G06V 20/20 715/771 |

FOREIGN PATENT DOCUMENTS

| | | |
|---|---|---|
| CN | 104090761 A | 10/2014 |
| EP | 1473634 | 11/2004 |
| EP | 2105845 | 9/2009 |

OTHER PUBLICATIONS

Chinese Office Action dated on Mar. 29, 2021, in corresponding Chinese Patent Application No. 201680053684.9, filed on Jul. 15, 2016 (14 pages).

Transmittal of the International Preliminary Report on Patentability for International Application No. PCT/US2016/042483 mailed by the International Bureau of WIPO, containing the Written Opinion of the European Patent Office, dated Jan. 25, 2018, 9 pages.

Tedickey: "File Format", Wikipedia, Jun. 26, 2015, Retrieved from the internet: URL: https:/en.wikipedia.org/w/index.php?title=File_format&oldid=668731795 [retrieved on Oct. 18, 2016].

108.171.130.164: "Fingerprint {computing)", Wikipedia, Dec. 9, 2014, Retrieved from the Internet: URL:https:/en.wikipedia.org/w/index.php?title=Fingerprint_%28computing%29&oldid=637387333 [retrieved on Oct. 20, 2016].

\* cited by examiner

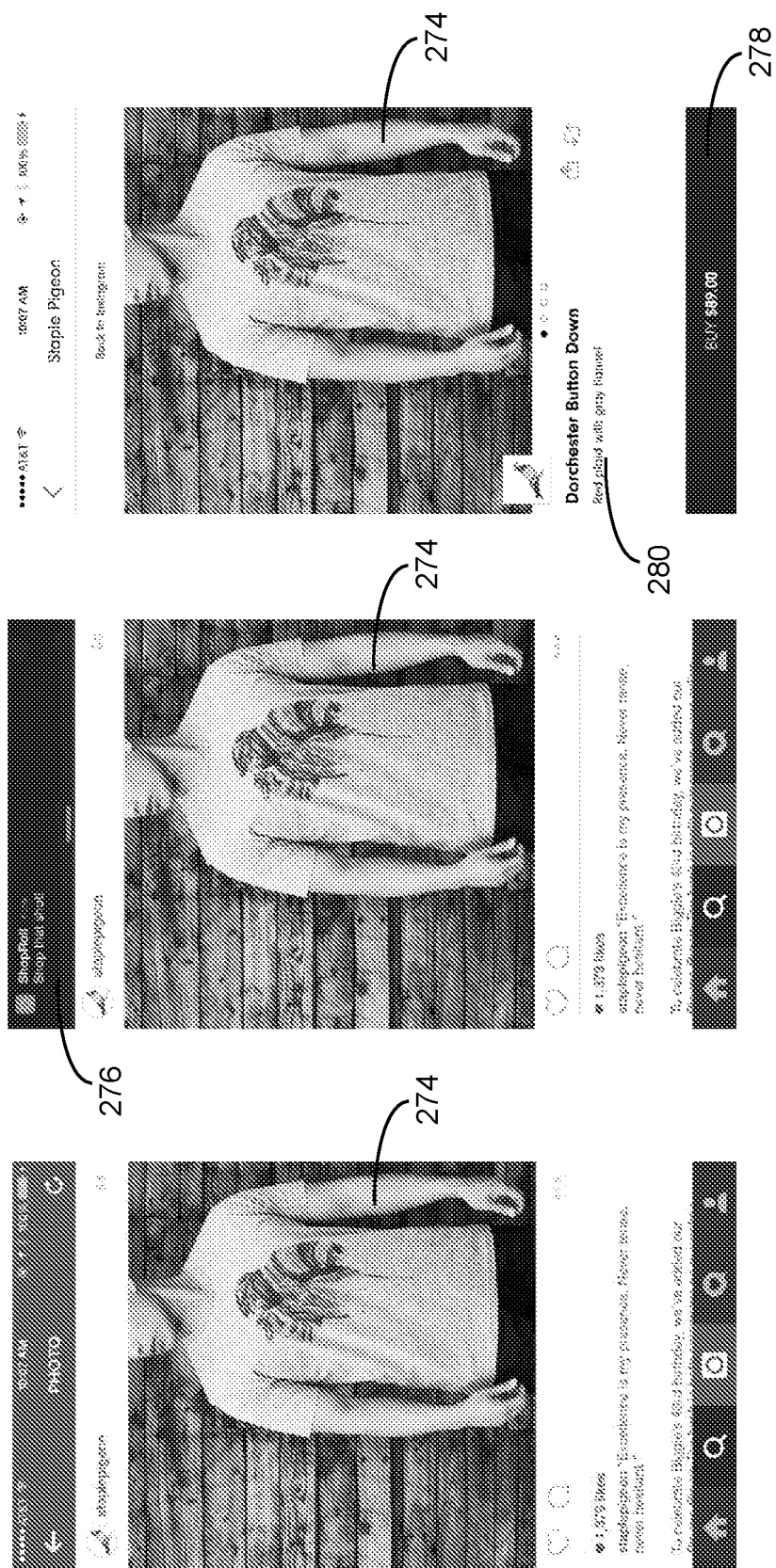

SYSTEMS AND METHODS FOR SCREENSHOT LINKING

CROSS-REFERENCE TO RELATED APPLICATIONS

This application is a continuation of and claims the benefit of priority to U.S. Nonprovisional patent application Ser. No. 16/989,573, filed Aug. 10, 2020, which is a continuation of U.S. Nonprovisional patent application Ser. No. 15/344,342, filed Nov. 4, 2016, now U.S. Pat. No. 10,740,387, issued Aug. 11, 2020, which is a continuation of U.S. Nonprovisional patent application Ser. No. 15/211,321, filed Jul. 15, 2016, now U.S. Pat. No. 10,423,657, issued Sep. 24, 2019, which claims the benefit of priority to U.S. Provisional Patent Application No. 62/192,873, filed Jul. 15, 2015, all of which are incorporated herein by reference in their entireties.

FIELD OF THE DISCLOSURE

The present disclosure is generally directed to linking screenshots to other resources. In particular, the present disclosure describes techniques for analyzing images to identify a screenshot and provide a link to another resource or content associated with the screenshot.

BACKGROUND OF THE DISCLOSURE

Companies can use the Internet to advertise or promote their brands and products. Users of client devices can view content provided by companies using a web browser or other application. Some users may capture screenshots relating to content that interests them on their client devices.

BRIEF SUMMARY OF THE DISCLOSURE

Systems and methods of the present solution are directed to linking screenshots to other resources. Consumer products companies often produce content that is published via the Internet. For example, a company may have its own website including web pages dedicated to its products or to brands associated with the company. In some instances, companies may promote their brands and products through third party web pages, such as social media sites. For example, many companies have one or more accounts on websites such as Facebook, Instagram, Pinterest, and Twitter. Users can view content published by a company by visiting the company's web pages or third party web pages on which the company publishes content. In some cases, users also may view content published by a company using a dedicated application on a client device, such as an application associated with a social media website on which the company publishes content.

Users can save to their devices images of content that interests them on the Internet. Users can accomplish this by capturing a screenshot of a display of the client device while the client device displays selected content. Typically, a screenshot refers to an image representing a portion or the entire graphical user interface of a display of a client device. Thus, a screenshot captured while the client device is being used to display content published by a company (for example, in a web browser or a third party application), will include the relevant content that the user wishes to save, and may also include other elements of the graphical user interface of the client device. A screenshot is often saved as an image file on the client device. In some client devices, the screenshots are saved in an image folder of the client device. The image folder is capable of storing the screenshots captured by the client device, regardless of the content or the application displayed on the client device at the time the screenshot was captured. In this way, the image folder can store screenshots of content displayed by multiple different applications of the client device.

Because screenshots typically include only image data, it can be difficult for a user to access content relevant to what is depicted in a screenshot when the user only has access to the screenshot itself. For example, while the screenshot may provide an image of a product that the user would like to purchase, the image file associated with the screenshot itself does not provide any interface with which the user can interact to purchase the product shown in the screenshot. The present disclosure provides techniques for linking a screenshot to other relevant resources and/or content, such as a shopping interface.

One aspect of the present disclosure can be implemented in a method or system for providing an online store associated with a screenshot. A screenshot linking system including one or more processors can identify a screenshot from images stored on a device, such as a photo roll on a mobile device storing both photos and screenshots. The screenshot linking system can identify an image included within the screenshot. The screenshot linking system can match the identified image with a reference image of a plurality of reference images maintained by the screenshot linking system. Each reference image can be associated with a link to content. In some implementations, the link can be a link to content on a mobile application or content on a webpage. In some implementations, the content to which the reference image is linked can include the reference image. Responsive to the screenshot linking system matching the image with a reference image, the screenshot linking system can then identify a link associated with the image. In some implementations, the screenshot linking system can generate and provide a notification to the device associated with the screenshot. The notification can include the link to content corresponding to the image identified in the screenshot. In some implementations, if the image in the screenshot is an image of a product, the link provided in the notification can be a link to a page of a mobile application or a web server through which the user of the device can purchase or otherwise receive additional information about the product. For example, if the image in the screenshot is of a shirt, the screenshot linking system can identify a link to a product page where the shirt is available for purchase, and can provide a notification including a link to the product page. In some implementations, responsive to the user visiting the page via the link, the screenshot linking system can receive, from the device, a request to purchase the product and execute the request to purchase the product. In some implementations, it can be determined that an image file corresponds to a screenshot, and the screenshot can be analyzed to identify at least one application associated with the screenshot.

As discussed above, users of computing devices may wish to save images of content that interests them, such as from web pages on the Internet or screens of mobile applications, in the form of screenshots. A screenshot can be processed to generate a link to other relevant content. In some implementations, it may be useful to determine an application associated with a screenshot for purposes of generating such a link. For example, a deep link may be a link to a particular page or portion of a particular application, such as the application that was used to generate the screenshot. Therefore, for the screenshot linking system to generate a deep link, the screenshot linking system may identify the identity of the application active on the display of the client device at the time the screenshot was captured. Furthermore, the screenshot linking system may also be useful to process only a subset of the screenshots saved on a client device, such as screenshots that are generated by only a subset of applications. For example, some applications may be added to a white list of applications whose screenshots are to be processed and linked to other content. Screenshots associated with applications not included in the white list may not be processed in order to save computing resources.

One aspect of this disclosure can be implemented in a method or system for determining an identity of an application that is associated with a particular screenshot. The screenshot linking system can identify an image file and determine that the image file corresponds to a screenshot. The screenshot linking system can identify one or more visual elements of the screenshot. The screenshot linking system can then determine an identity of an application corresponding to the screenshot based on the identified visual elements.

As discussed above, a screenshot may capture the graphical content displayed on a display screen of a client device. However, some of the visual elements of the screenshot may be irrelevant, such as elements of a user interface of the active application or other information that may be displayed on a client device, such as the time, date, and battery level of the client device. Therefore, it can be useful to separate the relevant content of a screenshot, such as an image provided by a content publisher, from the less relevant content that may be included within the screenshot. After an image has been identified and/or extracted, the image may be processed to determine a watermark or fingerprint associated with the image. Watermarks and fingerprints can be used to match the images with reference images provided by content publishers. In this way, if a user takes a screenshot of an image that matches a reference image of a content publisher, the screenshot linking system can provide the user, via the device of the user, a notification that includes a link to content corresponding to the reference image that matched the image of the screenshot. As a result, content publishers or advertisers can provide relevant content to users based on screenshots captured by the users.

One aspect of this disclosure can be implemented in a method or system for analyzing an image included within a screenshot. An image can be identified and/or extracted from a screenshot. A watermark of the image can be identified. The watermark can include additional information corresponding to the image. In some implementations, the watermark can include data representing a link to a page of a mobile application or web server that includes content associated with the image. The link can be a link to content of a product shown in the image. In some implementations, the link can be a link to content of an advertiser or entity that published or provided the image. In some implementations, responsive to identifying the link to content, the screenshot linking system can provide a notification to the client device including the link to content to allow the user of the client device to retrieve additional information relating to the image included in the screenshot.

Another aspect of this disclosure also can be implemented in a method for analyzing an image included within a screenshot. An image can be identified and/or extracted from a screenshot. The screenshot linking system or a mobile application corresponding to the screenshot linking system can generate a fingerprint of the image can be generated. The screenshot linking system can then identify a fingerprint of a reference image that matches the fingerprint of the image of the screenshot. The screenshot linking system, responsive to determining that the fingerprint of the image of the screenshot matches the identified fingerprint of the reference image, can identify a link to content associated with the image. The screenshot linking system can then generate and provide a notification including the link to the user of the device. In this way, the screenshot linking system can provide the user relevant content based on images included in screenshots captured by the user. As a result, advertisers or content publishers can send links relevant to the user to increase user engagement.

Users who capture screenshots depicting particular types of products may not be interested in other unrelated types of products. However, products similar to those that are depicted in the screenshots that a user captures may be of more interest to the user. As a result, the user may be more likely to purchase a product that is similar to the products depicted in the screenshots captured by the user. In some implementations, the screenshots and purchasing decisions of the user, as well as those of other users, can form the basis for a product recommendation for the user.

One aspect of this disclosure can be implemented in a method for providing a product recommendation to a user. To provide recommendation to one or more users, the screenshot linking system can build one or more recommendation engines. The recommendation engines can rely on models that process input data to generate output data in the form of recommendations. The input data can be referred to as training data that is provided to the recommendation engine to train the model. The models can be adaptive and continually learning.

In some implementations, the recommendation engine can be configured to determine recommendations for a user based on a user's screenshots. The recommendation engine can determine recommendations of products that are similar to products identified in the user's screenshots. In some implementations, the recommendation engine can rely on screenshots of other users that the recommendation engine determines are similar to screenshots captured by the user. In this way, the recommendation engine can generate product recommendations for the user based on screenshots and images included in the screenshots captured by the other users of the screenshot linking system.

In some implementations, the recommendation engine can be configured to identify users that are similar to one another based on the screenshots captured by each of the users. In this way, the recommendation engine can recommend products in which users similar to the user have expressed an interest. Similarly, advertisers or other content providers may choose to generate marketing or advertising campaigns directed towards users that are similar to one another and that are likely interested in the products of the advertisers. The recommendation engine can be configured to generate a mode to identify users similar to one another based on the screenshots of each of the users.

According to one aspect, a first plurality of user profiles can be generated for a plurality of users based on screenshots associated with the plurality of users. A plurality of categories to which the user profiles belong can be determined. Each user profile can be assigned to at least one of the plurality of categories. A recommendation model can be built for each category. A second user profile, not included in the first plurality of user profiles, can be identified. A category to which the second user profile should be assigned can be identified. A product recommendation can be provided to the second user based on the category to which the second user profile is assigned.

According to another aspect, the screenshot linking system can receive a plurality of screenshots captured by a device of a user. The screenshot linking system can identify images included in the screenshot. The screenshot linking system can, from the images, identify one or more categories to which the images correspond. In some implementations, the categories can be based on topics, such as clothing, furniture, or electronics, among others. In some implementations, the categories can be based on brands. In some implementations, the categories can be based on other attributes. Responsive to determining the categories to which the screenshots belong, the screenshot linking system can generate a user profile based on the categories of the screenshots. The screenshot linking system, via a recommendation engine that uses data from a large number of users, can provide recommendations of products (or content in general) based on a comparison of the user's profile with user profiles of other users and the screenshots corresponding to the other users.

At least one aspect of this disclosure can be implemented as method for analyzing screenshots to identify links to resources. The method can include accessing, by an application executing on a computing device from storage to which a screenshot captured using a screenshot capture function of the computing device is stored, the screenshot including an image and a predetermined marker. The method can include detecting, by the application, the predetermined marker included in the screenshot. The method can include identifying, by the application, using the predetermined marker, a link to a resource mapped to the image included in the screenshot. The method can include accessing the resource via the link.

In some implementations, the storage to which the screenshot is stored can be accessible by multiple applications executing on the computing device. In some implementations, the predetermined marker can include a visual marker added to the image included in the screenshot. In some implementations, the predetermined marker can include metadata uniquely identifying the image included in the screenshot or the image can be encoded with data corresponding to the predetermined marker. In some implementations, the predetermined marker can include a code comprising a string of characters.

In some implementations, the method can include comparing the predetermined marker to a plurality of reference markers. The method also can include determining a match between the predetermined marker and one of the plurality of reference markers. The method also can include selecting the link to the resource based on the one of the plurality of reference markers.

In some implementations, accessing the resource via the link can include accessing the resource responsive to selection of the link from a notification including the link. In some implementations, the application can be a first application and the link can include a deep link corresponding to a resource within a second application executable on the computing device.

Another aspect of this disclosure can be implemented as system for analyzing screenshots to identify links to resources. The system can include a computing device including a processor coupled to a memory and a display screen configured to display content. The system can include an application stored on the memory and executable by the processor. The application can include a screenshot receiver configured to access, from storage to which a screenshot of the content displayed on the display screen captured using a screenshot function of the computing device is stored, the screenshot including an image and a predetermined marker. The application can include a marker detector configured to detect the predetermined marker included in the screenshot. The application can include a link identifier configured to identify, using the predetermined marker, a link to a resource mapped to the image included in the screenshot, the resource accessible by the computing device via the link.

In some implementations, the storage to which the screenshot is stored can be accessible by multiple applications executing on the computing device. In some implementations, the predetermined marker can include a visual marker added to the image included in the screenshot. In some implementations, the predetermined marker can include metadata uniquely identifying the image included in the screenshot or the image can be encoded within data corresponding to the predetermined marker. In some implementations, the predetermined marker can include a code comprising a string of characters.

In some implementations, the system also can include a screenshot linking server. The screenshot linking server can be configured to receive the predetermined marker from the computing device. The screenshot linking server can be configured to compare the predetermined marker to a plurality of reference markers. The screenshot linking server can be configured to determine a match between the predetermined marker and one of the plurality of reference markers. The screenshot linking server can be configured to select the link based on the one of the plurality of reference markers. In some implementations, the application can be a first application and the link can include a deep link corresponding to a resource within a second application executable on the computing device.

Another aspect of this disclosure can be implemented as a method for analyzing screenshots to identify links to resources. The method can include accessing, by an application executing on a computing device from storage to which a screenshot has been captured by a screenshot function of the computing device, the screenshot including an image. The method can include extracting, by the application, data corresponding to the image included in the screenshot. The method can include generating, by the application, a fingerprint identifying the image, the fingerprint generated based on the data corresponding to the image. The method can include identifying, by the application, a link to a resource mapped to the fingerprint of the image. The method can include accessing the resource via the link.

In some implementations, the method can include identifying the image from the screenshot by performing image entropy analysis on the screenshot to determine a portion of the screenshot that corresponds to the image. In some implementations, the application can be a first application and the link can include a deep link corresponding to a resource within a second application that can execute on the computing device. In some implementations, identifying, by the application, the link to the resource mapped to the fingerprint of the image can further include identifying the link responsive to determining a match between the fingerprint and a plurality of reference fingerprints based on a comparison of the fingerprint of the image to a plurality of reference fingerprints.

Another aspect of this disclosure can be implemented as a system for analyzing screenshots to identify links to resources. The system can include a computing device including a processor coupled to a memory and a display screen configured to display content. The system can include an application stored on the memory and executable by the processor. The application can include a screenshot receiver configured to access, from storage to which a screenshot of the content displayed on the display screen captured using a screenshot function of the computing device is stored, the screenshot including an image. The application can include an image extractor configured to extract data corresponding to the image included in the screenshot. The application can include a fingerprint generator configured to generate a fingerprint identifying the image included in the screenshot based on the data corresponding to the image. The application can include a link identifier configured to identify, using the fingerprint, a link to a resource mapped to the image included in the screenshot. The application can include a resource display component configured to access the resource via the link.

In some implementations, the image extractor can be further configured to identify the image from the screenshot by performing image entropy analysis on the screenshot to determine a portion of the screenshot that corresponds to the image. In some implementations, the application can be a first application and the link can include a deep link corresponding to a resource within a second application that can execute on the computing device. In some implementations, the link identifier can be configured to identify the link to the resource responsive to determining a match between the fingerprint and a plurality of reference fingerprints based on a comparison of the fingerprint of the image to a plurality of reference fingerprints.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 2C-2G illustrate various stages of a process for linking a screenshot to a product purchase page;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for linking a screenshot to other content.

Section C describes embodiments of systems and methods for determining an application associated with a screenshot.

Section D describes embodiments of systems and methods for analyzing an image included within a screenshot.

Section E describes embodiments of systems and methods for providing a product recommendation to a user.

A. Computing and Network Environment

Figure 1A:
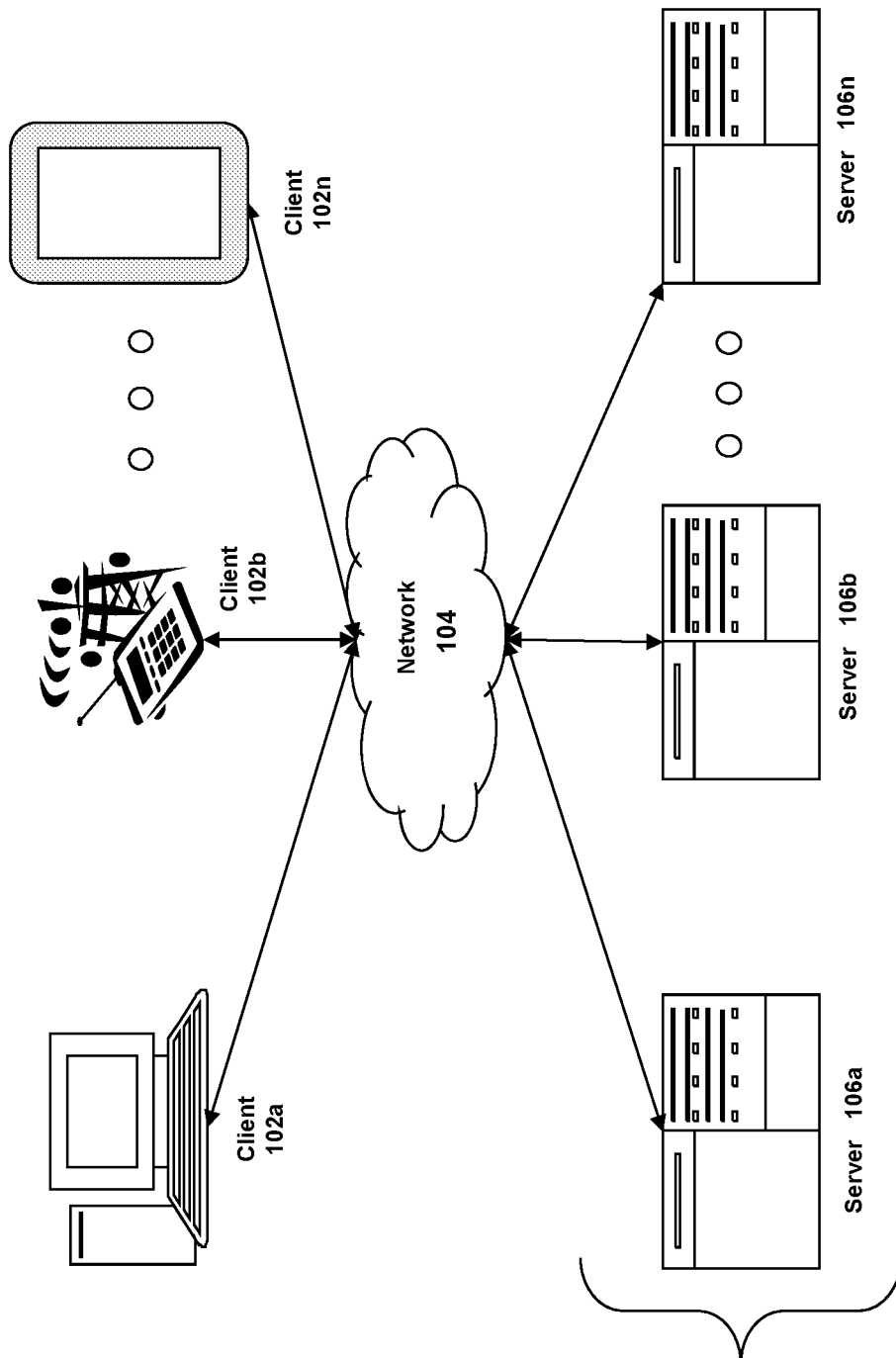
FIG. 1A is a block diagram depicting an embodiment of a network environment comprising a client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
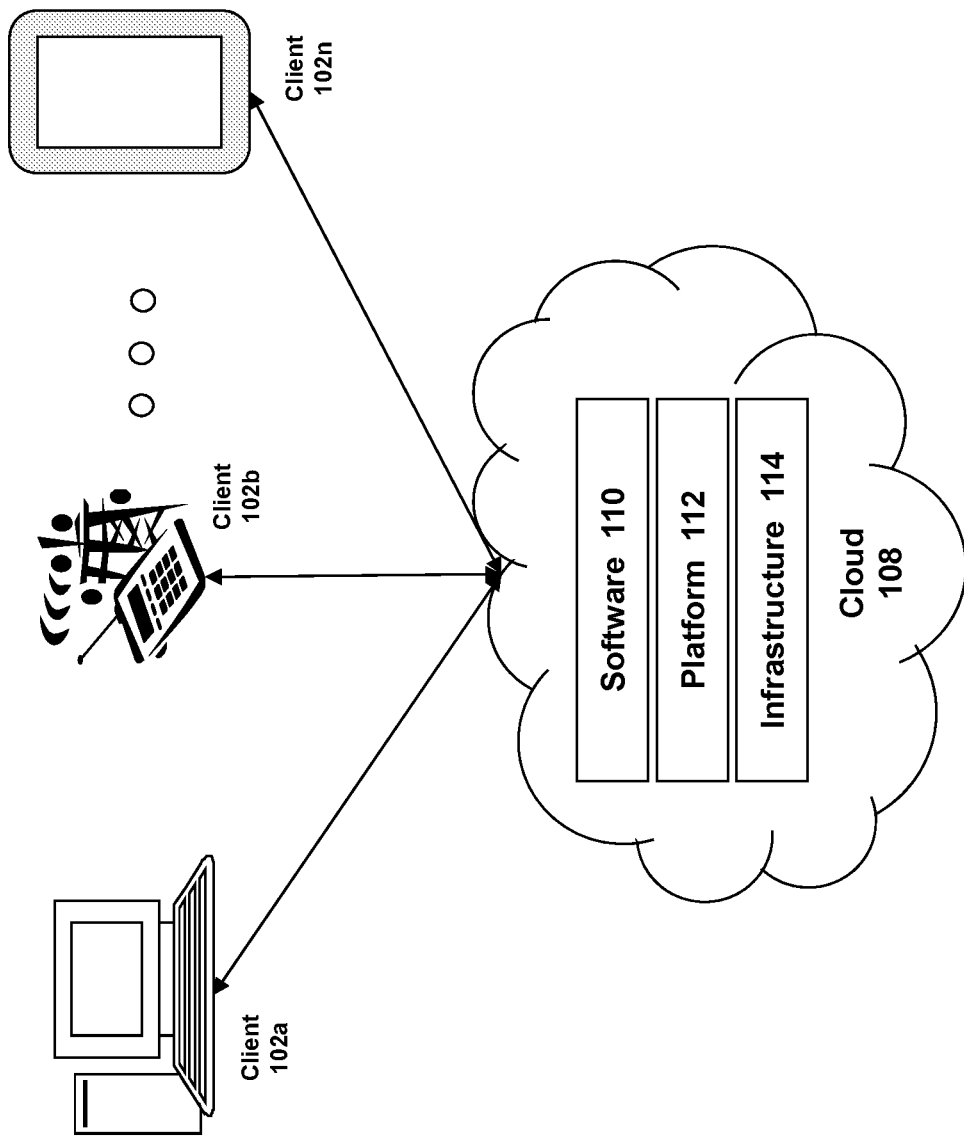
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
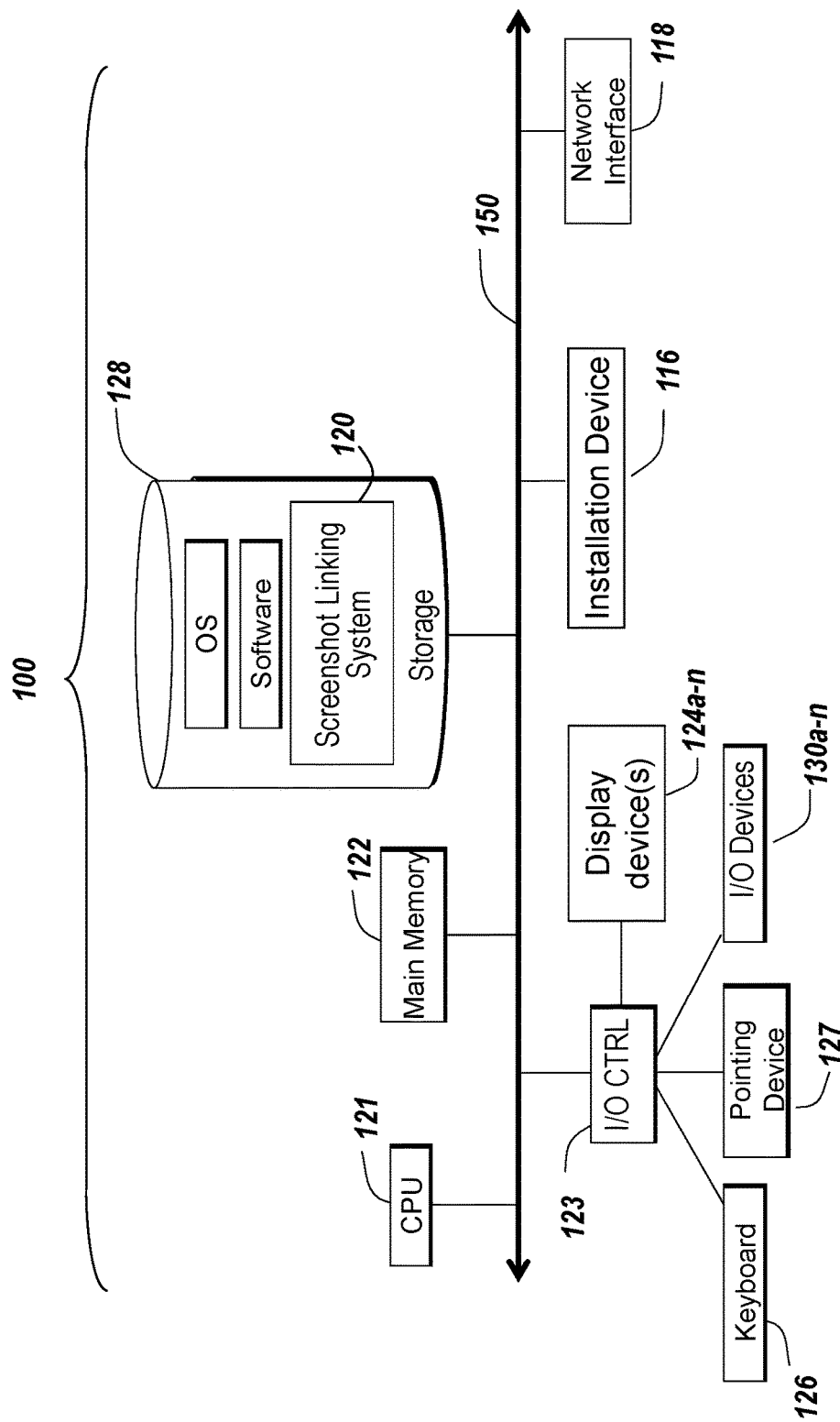
FIGS. 1C and 1D are block diagrams depicting embodiments of computing devices useful in connection with the methods and systems described herein.
Figure 1D:
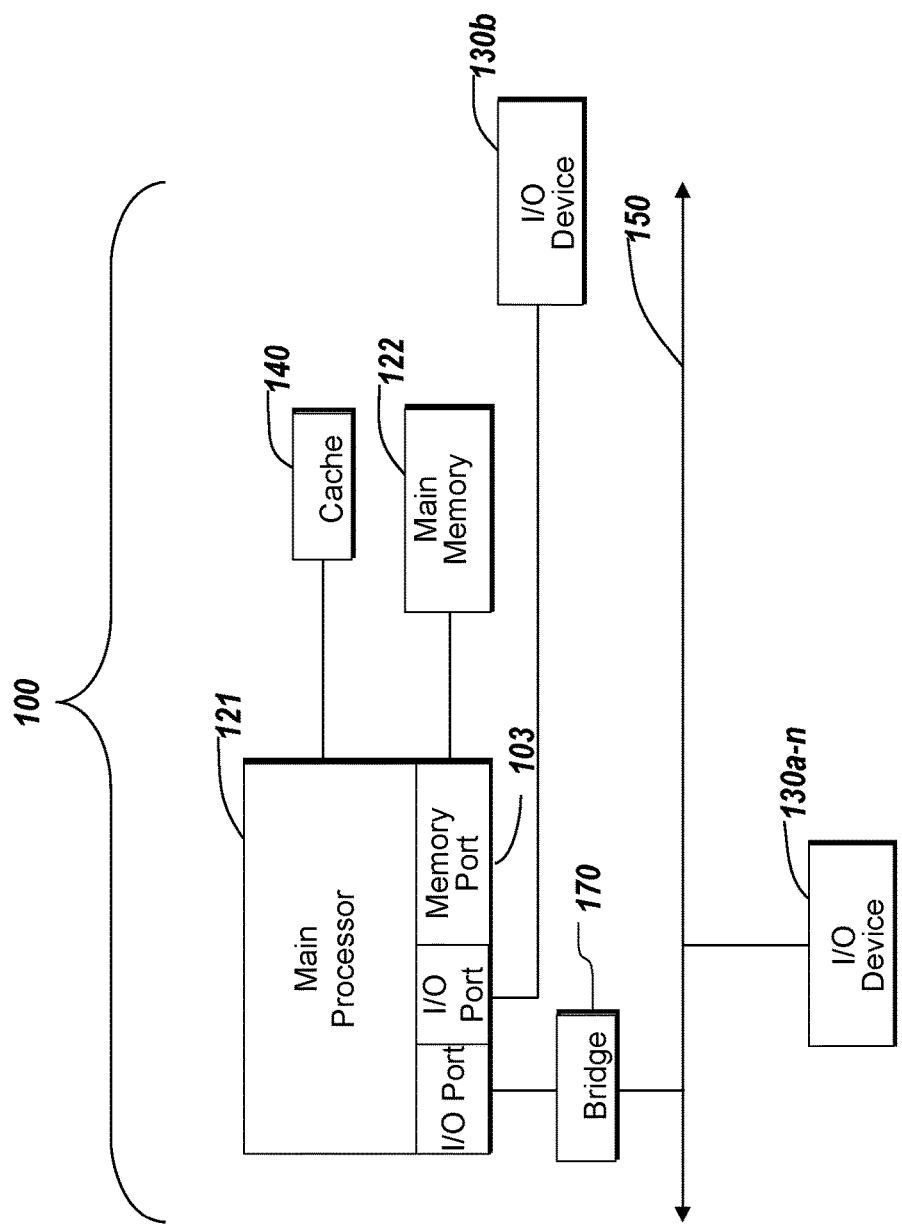

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a screenshot linking system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAIVI), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the screenshot linking system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2022, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Linking a Screenshot to Other Content

Systems and methods of the present solution are directed to linking screenshots to other resources. Consumer products companies often produce content that is published via the Internet. For example, a company may have its own website including web pages dedicated to its products or to brands associated with the company. In some instances, companies may promote their brands and products through third party web pages, such as social media sites. For example, many companies have one or more accounts on websites such as Facebook, Instagram, Pinterest, and Twitter. Users can view content published by a company by visiting the company's web pages or third party web pages on which the company publishes content. In some cases, users also may view content published by a company using a dedicated application on a client device, such as an application associated with a social media website on which the company publishes content.

Users can save to their devices images of content that interests them on the Internet. Users can accomplish this by capturing a screenshot of a display of the client device while the client device displays selected content. Typically, a screenshot refers to an image representing a portion or the entire graphical user interface of a display of a client device. Thus, a screenshot captured while the client device is being used to display content published by a company (for example, in a web browser or a third party application), will include the relevant content that the user wishes to save, and may also include other elements of the graphical user interface of the client device. A screenshot is often saved as an image file on the client device. In some client devices, the screenshots are saved in an image folder of the client device. The image folder is capable of storing the screenshots captured by the client device, regardless of the content or the application displayed on the client device at the time the screenshot was captured. In this way, the image folder can store screenshots of content displayed by multiple different applications of the client device.

Because screenshots typically may primarily include image data, it can be difficult for a user to access content relevant to what is depicted in a screenshot when the user only has access to the screenshot itself. For example, while the screenshot may provide an image of a product that the user would like to purchase, the image file associated with the screenshot itself does not provide any interface with which the user can interact to purchase the product shown in the screenshot. The present disclosure provides techniques for linking a screenshot to other relevant resource and/or content, such as a shopping interface.

One aspect of the present disclosure can be implemented in a method or system for providing an online store associated with a screenshot. A screenshot linking system including one or more processors can identify a screenshot from images stored on a device, such as a photo roll on a mobile device storing both photos and screenshots. The screenshot linking system can identify an image included within the screenshot. The screenshot linking system can match the identified image with a reference image of a plurality of reference images maintained by the screenshot linking system. Each reference image can be associated with a link to content. In some implementations, the link can be a link to content on a mobile application or content to a webpage. In some implementations, the content to which the reference image is linked can include the reference image. Responsive to the screenshot linking system matching the image with a reference image, the screenshot linking system can then identify a link associated with the image. In some implementations, the screenshot linking system can generate and provide a notification to the device associated with the screenshot. The notification can include the link to content corresponding to the image identified in the screenshot. In some implementations, if the image in the screenshot is an image of a product, the link provided in the notification can be a link to a page of a mobile application or a web server through which the user of the device can purchase or otherwise receive additional information about the product. In some implementations, responsive to the user visiting the page via the link, the screenshot linking system can receive, from the device, a request to purchase the product and execute the request to purchase the product. In some implementations, it can be determined that an image file corresponds to a screenshot, and the screenshot can be analyzed to identify at least one application associated with the screenshot.

Figure 2A:
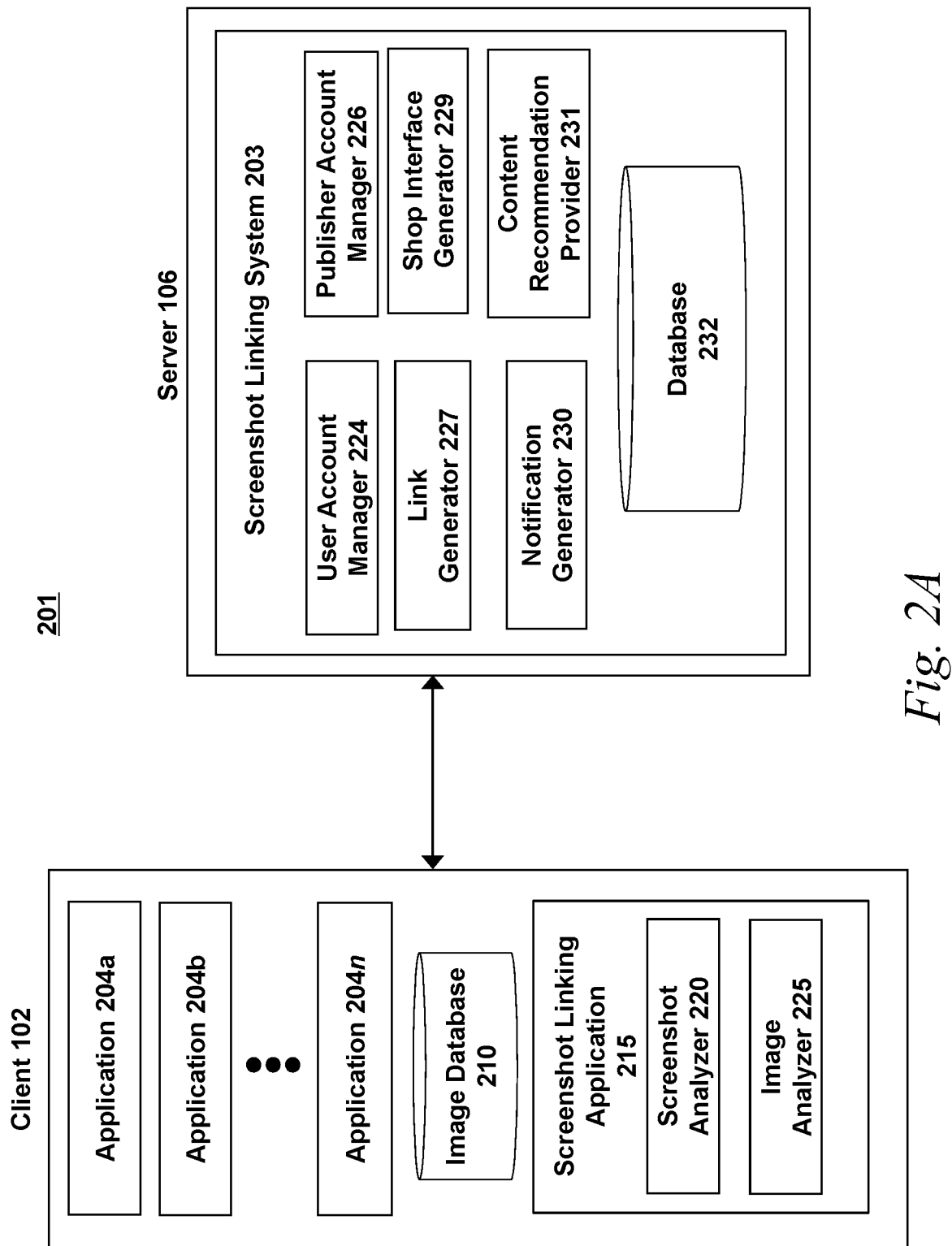
FIG. 2A is a block diagram depicting an embodiment of a system for linking a screenshot to other content.

Referring now to FIG. 2A, a block diagram depicting an embodiment of a system 201 for linking a screenshot to other resources or content is shown. In brief overview, the system 201 can include a client device, such as the client 102, and a server, such as the server 106. The client device can include a plurality of applications 204a-204n, an image database 210, and a screenshot linking application 215. The server can include a screenshot linking system 203 having a user account manager 224, a publisher account manager 226, a link generator 227, a shop interface generator 229, a notification generator 230, a content recommendation provider 231, and a database 232.

The client 102 can be any type of computing device with which a user can interact directly. For example, in some implementations, the client 102 can be a desktop computer, a laptop computer, a tablet computing device, a smartphone, or a virtual reality computing device. The applications 204 can be installed on the client 102 to allow the user to access various forms of content. For example, one or more of the applications 204 may correspond to web browsers configured to display web pages. Other applications 204 may correspond to social media applications, such as Facebook, Instagram, Pinterest, and Twitter. Still other applications 204 may be applications provided by consumer products companies that allow a user of the client 102 to view information about products made available by the companies who develop the applications 204. Applications 204 also can correspond to various other utilities such as calendars, clocks, word processing applications, mapping applications, news providers, messaging applications, email applications, and the like. Computer instructions corresponding to each of the applications 204 may be stored in a memory associated with the client 102. When a user executes a particular application 204, graphical output from the application 204 can be displayed on a display screen associated with the client 102.

In some implementations, the client 102 can execute an operating system that provides a file directory structure and various user interface elements. For example, the operating system of the client 102 can be configured to allow a user to capture a screenshot of a graphical user interface of the client device 102. In some implementations, a screenshot may be an image representing all of the graphical output displayed on a display screen of the client 102 at the time the screenshot is captured. A screenshot can be an image file depicting this graphical output. In some implementations, screenshots may be stored on the client device in the image database 210. For example, the image database 210 can correspond to a file directory provided by the operating system of the client 102. In some implementations, the image database 210 can be a portion of a larger memory associated with the client 102 that is dedicated to storing images, including screenshots that may be captured using a screenshot capture function of the client 102. In some implementations, when a user captures a screenshot using an image capture function of the client 102, the resulting image file can be saved automatically in the image database 210. In some other implementations, a user may manually select the file directory corresponding to the image database for storing a screenshot, after the screenshot has been captured on the client 102.

The file directory corresponding to the image database 210 can be shared among (e.g., accessible by) multiple applications 204. In some implementations, various applications 204 of the client 102 can access the image database 210. For example, screenshots captured when any of the various applications 204 is displayed on the device may be automatically saved in the image database 210. The image database 210 can therefore serve as a shared memory between the various applications 204 on the client 102. As a result, the screenshots saved from many different applications can be accessed in a single location, such as the image database 210. In some implementations, the client 102 also may include a screenshot receiver, which may be implemented as computer-executable instructions that may execute, for example, as part of an operating system executing on the client 102. Any of the various applications 204 may use the screenshot receiver to access screenshots stored in the image database 210. In contrast, most other data collected from an application 204 is stored in a separate folder or portion of memory that is separated from the data stored by other applications 204.

The client device 102 also includes a screenshot linking application 215. The screenshot linking application can be executed on the client device in a manner similar to the applications 204 discussed above. The screenshot linking application 215 can include a screenshot analyzer 220 and an image analyzer 225. In some implementations, the screenshot linking application 215 can interact with the image database 210 to retrieve and process image files stored in the image database 210. For example, the screenshot linking application 215 can retrieve an image file corresponding to a screenshot from the image database 210. The screenshot analyzer 220 of the screenshot linking application 215 can process the screenshot image file, for example to extract one or more images from the screenshot. The image analyzer can then process the extracted images, as discussed further below. In some implementations, the screenshot linking application 215 can be configured to retrieve multiple image files corresponding to screenshots from the image database 210. In some implementations, the screenshot linking application 215 can identify the storage location, for example, the image database 210, where screenshots captured by the device are stored and then identify multiple image files corresponding to the screenshots captured by the device. In some implementations, the screenshot linking application can identify screenshots from other types of images files using image processing techniques, analyzing metadata associated with the screenshot files, among others.

The screenshot linking system 203 executing on the server 106 includes a user account manager 224 and a publisher account manager 226. In some implementations, the user account manager 224 can be used to create an account for a user of the client device 102, for example by collecting, storing, and modifying information relating to a user of the client device 102. For example, the user account manager 224 can store information such as a name, gender, age, email address, telephone number, and demographic information associated with a user of the client device 102. In some implementations, the user can input such information to the user account manager via a user interface provided on the client device 102 by the screenshot linking application 215. The user account manager 224 also can store information relating to the client 102, such as an IP address, a MAC address, a model number, or a serial number. All of the information associated with the user account can be stored in the database 232. In some implementations, information corresponding to the user account can be used to associate communications received from a client 102 with a particular user. For example, the user account manager 224 can determine a source address of communications originating from a client 102 and can compare the source address to information associated with user accounts stored in the database 232 to identify which client device 102 is associated with a particular communication.

The publisher account manager 226 can be used to create an account for a content publisher, such as a business. For example, the publisher account manager 226 can create an account including identification information associated with a content publisher by collecting such information from the content publisher and storing the information in the database 232. In some implementations, the publisher account manager 226 also can store information relating to content provided by the content publisher. For example, the publisher account manager 226 can receive images, such as those used in advertisements published by the content publisher. In some implementations, such content can be stored in the database 232 and associated with the account of the content publisher.

The screenshot linking system 203 also includes the link generator 227, which can be used to generate a link associating image data received from the client 102 with another resource, such as a URL or an application. For example, in some implementations the link generator 227 can map an image to a resource. The shop interface generator 229 can be used to generate an interface through which a user of the client 102 can purchase products. In some implementations, the interface generated by the shop interface generator 229 can be provided to the client 102, allowing a user to make purchases via the client 102. The notification generator 230 can generate information corresponding to a notification and can transmit the notification to the client 102 to alert the user of the client 102 that the notification has been generated. In some implementations, a notification can include a link generated by the link generator 227. The content recommendation provider 231 can receive information relating to activity of the user of the client 102, and can generate a recommendation of a product that may be of use to the user. The recommendation can then be provided to the client 102, for example in the form of a notification. These components are discussed further below.

It should be understood that the block diagram of FIG. 2A is intended to be illustrative only. For example, while components of the system 201 are shown as executing on either the client 102 or the server 106, in some implementations, components shown as executing on the client 102 may instead be executed on the server 106. Similarly, components shown as executing on the server 106 may instead be executed on the client 102. In some implementations, one instance of a component, such as the screenshot analyzer 220, may be executed on the client 102 while a second instance of the same component is executing on the server 106.

Figure 2B:
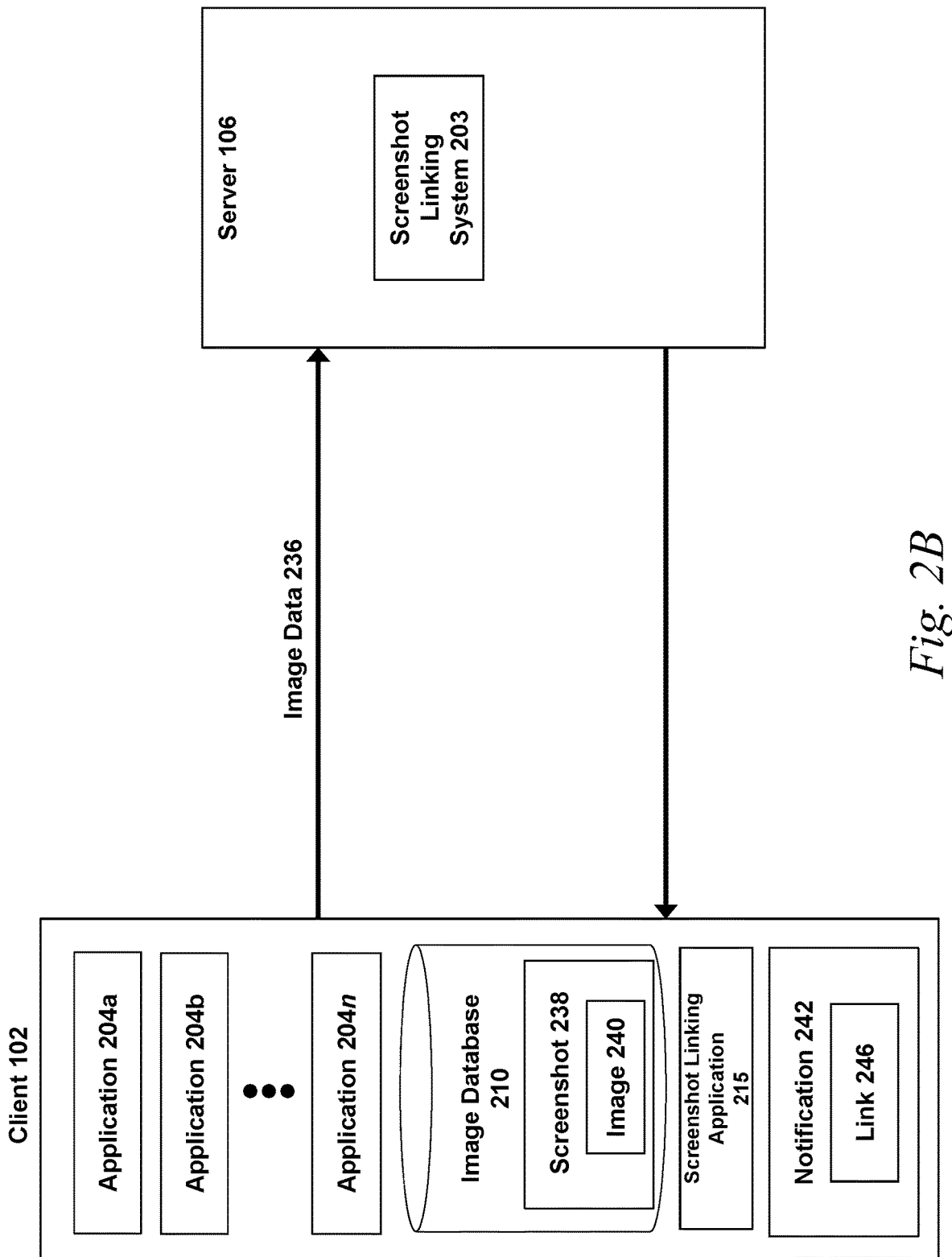
FIG. 2B is a conceptual diagram depicting an example use case for the system of FIG. 2A.
Figure 2G:
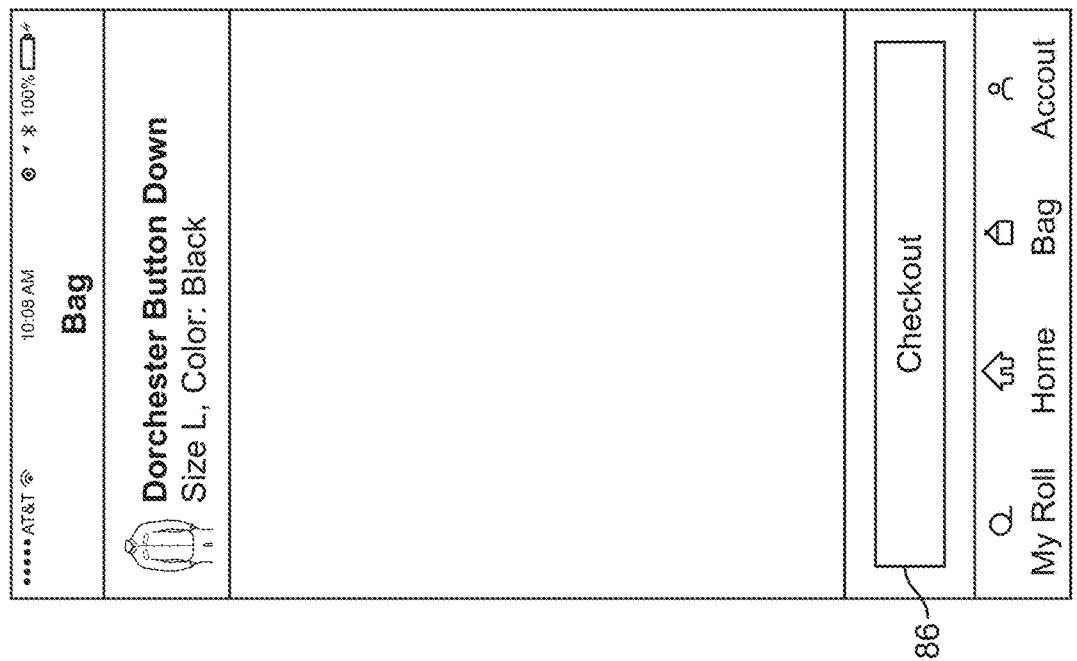

Referring now to FIG. 2B, a conceptual diagram depicting an example use case for the system 201 of FIG. 2A is shown. The client 102 is configured to send image data 236 to the server 106. The server 106 is also configured to transmit information to the client 102. As shown in FIG. 2B, the image database 210 includes a screenshot 238, which includes an image 240. In some implementations, the screenshot linking application 215 can receive the screenshot 238 from the image database 210. For example, the screenshot linking application 215 may continuously or periodically monitor the image database 210 for new screenshots 238, and may retrieve the screenshot 238 from the image database 210. For example, in some implementations, the screenshot linking application 215 can scan the image database 210 and sequentially process each image stored in the image database 210 according to the techniques described further below. In some implementations, the screenshot linking application 215 itself may process the screenshot 238 to extract the image 240. For example, the screenshot linking application may include an image extractor configured to extract the image 240 from the screenshot 238. In some other implementations, the screenshot linking application 215 may send image data 236 corresponding to the screenshot 238 to the screenshot linking system 203 on the server 106, where the screenshot linking system 203 may process the screenshot 238 to extract the image 240. After the image 240 has been extracted, a link associated with the image can be identified. The link itself may not be included in the screenshot 238. For example, in some implementations, the image 240 can be matched to a reference image that corresponds to an image associated with the account of a content provider, as discussed above. The reference image can be associated with a link, and the link can be associated with the screenshot 238 responsive to determining the match. The match can be determined locally on the client 102, or remotely by the server 106. In some other implementations, the link may be determined without comparing the image 240 to a reference image. For example, a watermark or fingerprint associated with the image 240 can be used to determine the link, as discussed further below. In some implementations, reference images can be retrieved from social media websites on which content publishers promote products. For example, the posts of a particular company can be scanned on a social media site and fingerprints can be generated for each image. The image and the generated fingerprints can then be saved and can then serve as reference images.

In some implementations, the screenshot linking system 203 can determine the number of times that a particular piece of content provided by a content publisher has been captured in a screenshot by clients such as the client 102. For example, for each published content item (e.g., images, social media posts, etc.) provided by a content provider, the screenshot linking system 203 can maintain a counter that is increased each time the screenshot linking system 203 receives image data 236 indicating that a screenshot including the content item has been captured. The counter can be increased in response to receiving such image data from any number of clients similar to the client 102. Thus, the counter for each content item can serve as a measure of popularity for each content item. In some implementations, the counter information can be provided to a user of the client 102. For example, when a screenshot is captured on the client 102, the screenshot linking system 203 can send to the client 102 information representing the number of times other users of other client devices have captured screenshots with the same content item featured in the screenshot captured by the client 102. In some implementations, the counter information for each content item also can be provided to the content publishers. For example, content publishers can use this information to better understand which content items are likely to be captured in screenshots by users of client devices, such as the client 102. In some implementations, a content publisher can be notified each time a user captures a screenshot featuring a content item that was provided by the content publisher. A content publisher also can be provided with information regarding the identity of users who have captured screenshots featuring content items published by the content publisher. In some implementations, the screenshot linking application 215 can provide an interface through which a content publisher can communicate with a user of the client 102, in response to a determination that the client 102 has captured a screenshot featuring a content item provided by the content publisher.

A notification 242 including the link 246 can then be generated. In some implementations, the notification 242 can be generated on the client 102. In some other implementations, the notification 242 can be generated by the screenshot linking system 203 executing on the server 106. In some implementations, reference images can be retrieved from social media websites on which content publishers promote products. For example, the posts of a particular company can be scanned on a social media site and fingerprints can be generated for each image. The image and the generated fingerprints can then be saved and can then serve as reference images. The notification 242 can alert a user of the client 102 that a link 246 associated with the screenshot 240 has been identified. In some implementations, the link 246 can be or can include a URL. For example, the URL can direct a web browser executing on the client 102 to a website operated by the company who published the image 240, responsive to a user of the client 102 selecting the link 246. The website can be configured to display information relating to a product shown in the image 240 of the screenshot 238.

In some implementations, the notification 242 can be displayed on the client 102 over the active application 204. For example, if a screenshot is taken while a particular application 204 is active on the client 102, the screenshot may be processed as discussed above and the notification 242 can be displayed over a view port of an active application 204 currently displayed on the device. In some implementations, the notification 242 can be a popup notification. The notification 242 may include text notifying a user of the client 102 that a link 246 associated with the most recently captured screenshot has been identified. In some implementations, the link 246 may be displayed in the notification 242. In some other implementations, a user can select the notification 242 to be directed to a different page or application 204 in which the associated link 246 is displayed. In some implementations, the notification can be a local notification generated by the screenshot linking application executing on the device. In some implementations, the notification can be a push or remote notification that is triggered by a server of the screenshot linking system and received by the device, upon which the notification is displayed.

In some other implementations, the link 246 can link to a particular post that has been viewed on one of the applications 204. For example, selecting the link 246 can cause one of the applications 204 to open and to display a post containing an image matching the image 240 that is included in the screenshot 238. Thus, a user may select the link 246 to be directed to the original post that was displayed on the client 102 when the screenshot 238 was captured.

In still other implementations, the link 246 can direct a user to a generic shopping interface that may not be associated with the company who published the image 240. For example, the shopping interface may be provided by the operator of the screenshot linking system 203, or by a third party. The shopping interface can allow a user to purchase a product shown in the image 240, as discussed further below.

Figure 2F:
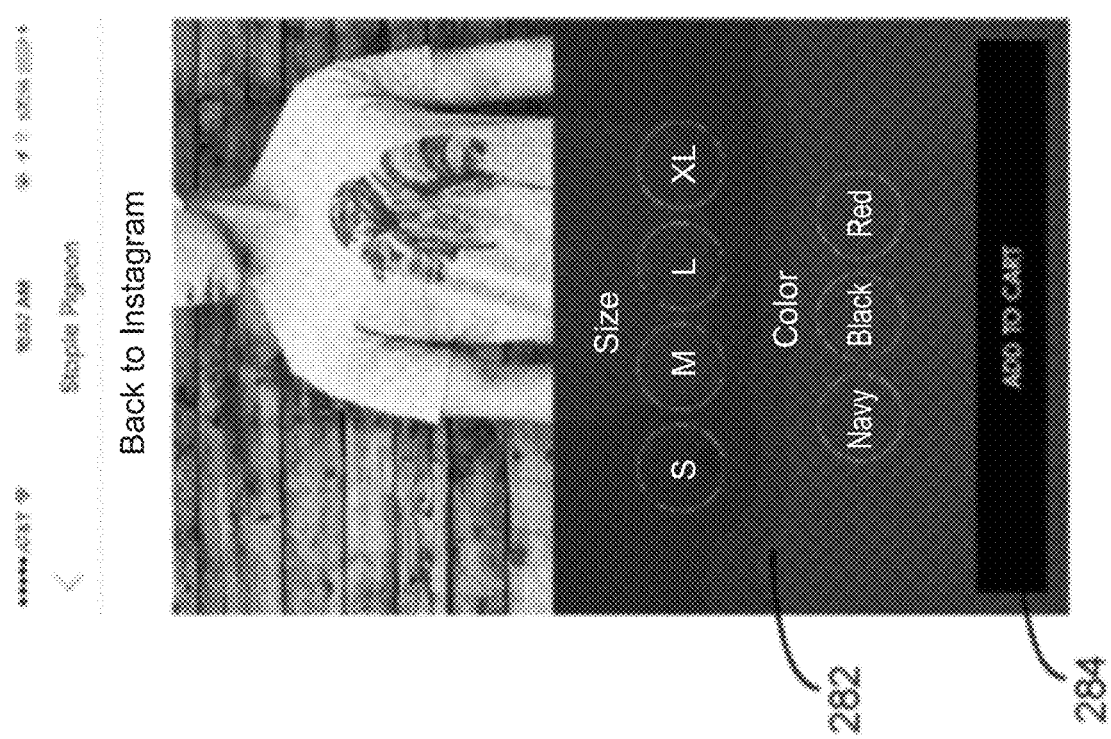

FIGS. 2C-2G illustrate various stages of a process for linking a screenshot to a product purchase page. FIG. 2C shows a screenshot captured by a user of the client 102. The screenshot includes an image 274 including a product (in this case, a shirt), as well as various user visual features, such as interface elements. As described above, and discussed further below, the screenshot shown in FIG. 2C can be processed to extract the image 274, and to identify a link associated with the image 274. A notification 276 including the link can then be provided, as shown in FIG. 2D. A user can select the link included within the notification 276, which can cause the client 102 to display the shopping interface shown in FIG. 2E. As shown, the shopping interface can include a picture of the original image 274, as well as a button 278 that can be selected if a user wishes to purchase the product shown in the image 274. The shopping interface also can include additional information related to the product, such as a description 280 and the name of the company who produces the product (in this instance, Staple Pigeon). Selecting the button 278 can cause the shopping interface to display additional selectable options 282 related to the product, such as the desired size and color of the product, as shown in FIG. 2F. An "add to cart" button 284 can be selected after the user has selected one or more of the options 282. After the product is added to the cart, the shopping interface can display a checkout screen, including a checkout button 286. Selecting the checkout button 286 can complete the sale of the product to the user.

In some implementations, the user account manager 224 can store payment information, such as a credit card number and shipping address, in the database 232. Selecting the checkout button 286 can then cause the product to be billed to the credit card associated with the user account of the client 102, and can notify a retailer that the selected product should be sent to the shipping address associated with the user account of the client 102. In some other implementations, the shopping interface may prompt the user to enter payment information and a shipping address manually in response to the user selecting the checkout button 286.

Figure 2H:
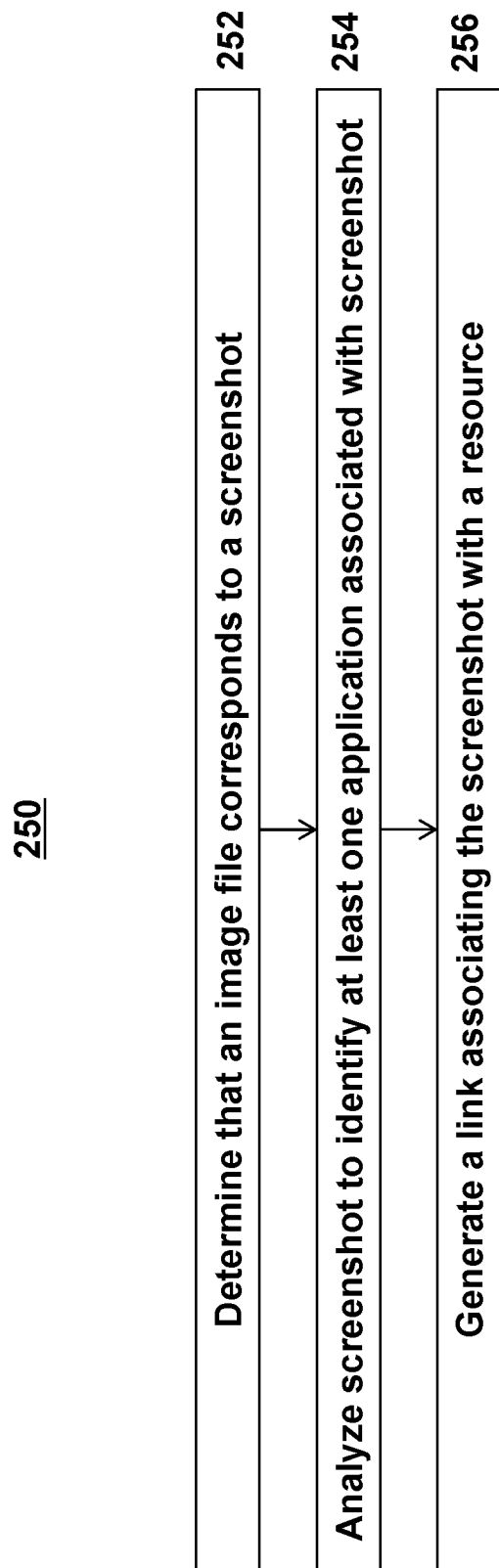
FIG. 2H is a flow chart of a process for linking a screenshot to other content.

FIG. 2H is a flow chart of a process 250 for linking a screenshot to other content. In brief overview, it can be determined that an image file corresponds to a screenshot (step 252), the screenshot can be analyzed to identify at least one application associated with the screenshot (step 254), and a link can be generated associating the screenshot with a resource (step 256).

Referring again to FIG. 2H, and in greater detail, the process 250 includes determining that an image file corresponds to a screenshot (step 252). Such a determination may be made, for example, by the screenshot analyzer 220 shown in FIG. 2A, which may include a screenshot detector, as described further below in connection with FIG. 3A. In some implementations, an image file can be obtained, retrieved or scanned from the image database 210. Characteristics of the image file can then be analyzed to determine whether the image file corresponds to a screenshot. For example, in some implementations, the resolution of the image file can be compared to the resolution of a display screen of the client 102. Because a screenshot captures an image representing what is displayed on a display screen of the client 102, a screenshot typically will have approximately the same resolution as the display screen of the client 102. Thus, in some implementations, the resolution of the display screen of the client 102 can be determined to compare the resolution of images on the client 102 to the resolution of the display screen. For example, the client 102 can have a display screen with a standard high definition (HD) resolution of 1920-by-1080, which is typical among many smartphones available. The screenshot linking application can determine a resolution of an image file, and if the resolution of the image file matches or is close to the resolution of the display screen of the client 102, the screenshot linking application can determine that the image file is a screenshot. Other resolutions are also possible for the display screen of the client 102. In some implementations, files having relatively high resolutions can be more likely to have been captured by a camera than captured as a screenshot. For instance, the resolution of a screenshot taken on an APPLE IPHONE 6 is 750×1334 (which is based on the resolution of the display screen), while the resolution of an image taken by the rear camera of the APPLE IPHONE 6 is 8 MP (which is based on the resolution of the camera). Other mobile devices may capture images and screenshots having different resolutions. In some other implementations, metadata associated with the image file can be used to determine whether the image file corresponds to a screenshot. For example, metadata may include an indication of an origin of the image file, which can help to determine whether the image file represents a screenshot. If metadata associated with the image file indicates that the image file was received by the client 102 from a remote computing device, it may be unlikely that the image file represents a screenshot captured on the client 102. In other implementations, other characteristics of the image file can be analyzed to determine whether the image file represents a screenshot. For example, in some implementations, the determination of whether the image file represents a screenshot can be based on a file size of the image file. In some implementations, smaller files may be more likely to have been captured as screenshots than as photos, for example.

After it has been determined that the image file corresponds to a screenshot, the screenshot can be analyzed to identify at least one application associated with the screenshot (step 254). This identification can be made, for example, by the screenshot analyzer 220 shown in FIG. 2A, which may include an application detector, as described further below. In some implementations, visual elements of the image file can be correlated with certain applications. In other implementations, metadata of the image file can be used to determine an application associated with the screenshot. Additional details regarding techniques for identifying an application associated with a screenshot are discussed below in Section B.

A link can then be generated associating the screenshot with a resource (step 256). In some implementations, the link can be generated by the link generator 227 shown in FIG. 2A. The generated link can be based on a product shown in an image within the screenshot. For example, the screenshot can include an image showing a particular product, and the link can be a URL associated with a web page that allows a user to receive more information about the product or to purchase the product. In some other implementations, the link can be directed to a particular post that has been viewed on one of the applications that executes on the client 102. In still other implementations, the link can direct a user to a generic shopping interface, such as the shopping interface shown in FIGS. 2C-2G. In each of these examples, a user may select the link from the notification, for example using a pointing device or other input device to select the link. Selection of the link may cause a resource display component of the client 102 to access the resource associated with the link (i.e., to display graphical content associated with the link).

Figure 2I:
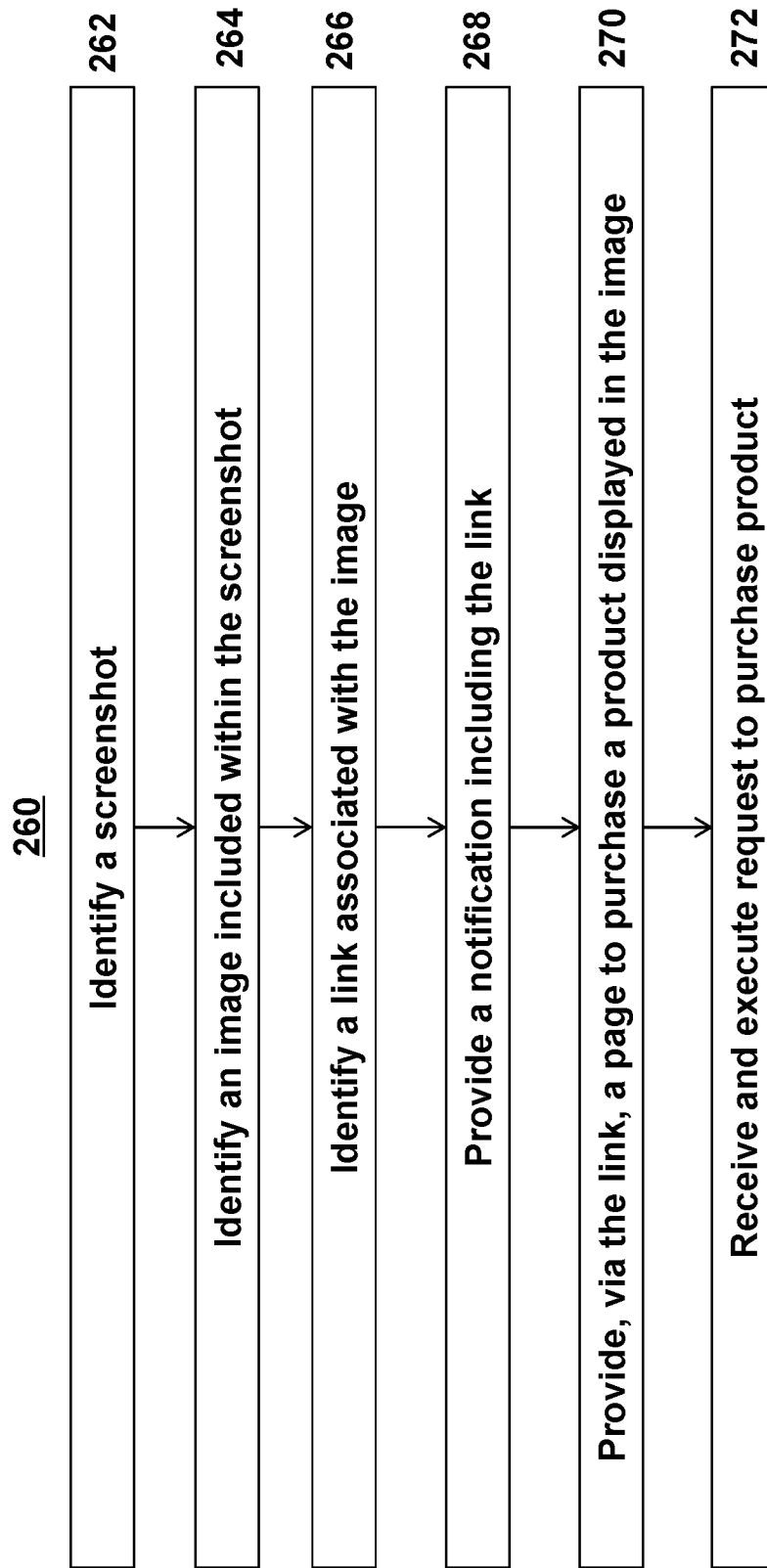
FIG. 2I is a flow chart of a process for providing an online store associated with a screenshot.

FIG. 2I is a flow chart of a process 260 for providing an online store associated with a screenshot. In brief overview, a screenshot can be identified (step 262). An image included within the screenshot can be identified (step 264). A link associated with the image can be identified (step 266). A notification including the link can be provided (step 268). A page can be provided via the link to purchase a product displayed in the image (step 270). A request to purchase the product can then be received and executed (step 272).

Referring again to FIG. 2I, and in greater detail, the process 260 can include identifying a screenshot (step 262). As discussed above, image files can be retrieved from the image database 210. In some implementations, the screenshot linking application 215 can monitor the image database 210 to determine when image files are added, and can process image files as they are added to the database 210 or otherwise on a predetermined frequency. In some implementations, image files can be processed to determine whether the image files correspond to screenshots, for example by examining dimensions of the image files such as file size and/or resolution. In some implementations, screenshots can be identified by the screenshot analyzer 220 shown in FIG. 2A.

The process 260 can include identifying an image included within the screenshot (step 264). In some implementations, the screenshot can be processed to identify and/or extract an image. Various techniques can be employed to identify and/or extract the image from the screenshot, as discussed further below in Section D. In some implementations, a component of the screenshot linking application 215 executing on the client 102, such as the screenshot analyzer 220 or the image analyzer 225 shown in FIG. 2A can extract the image from the screenshot. In other implementations, the screenshot can be transmitted from the client 102 to the server 106, and the image can be extracted from the screenshot by a component of the screenshot linking system 203 executing on the server 106.

The process 260 includes identifying a link associated with the image (step 266). In some implementations, the link can be generated by the link generator 227 shown in FIG. 2A and may be identified by a link identifier executing on the client 102. The link can be based on a product shown in the image extracted from screenshot. For example, the link can be a URL associated with a web page that allows a user to receive more information about a product shown in the image, or to purchase the product. In some other implementations, the link can be directed to a particular post that has been viewed on one of the applications that executes on the client 102.

In some implementations, the link can be a deep link. For example, a deep link can refer to a link to a particular page or portion of a particular application, such as the application that was used to generate the screenshot with which the link is associated. Thus, the link can direct a user to a certain portion or page of an application, rather than merely launching the application. In some implementations, a deep link can be a URL link to a particular piece of content on a website, for example a particular page, instead of the homepage of the website. When the user selects the link, the user can be brought directly to the relevant content on the website.

As discussed above, such a link can be referred to as a "deep link." In still other implementations, the link can direct a user to a generic shopping interface, such as the shopping interface shown in FIGS. 2C-2G.

The process 260 includes providing a notification including the link (step 268). In some implementations, the notification can be generated on the client 102, for example by the screenshot linking application 215. In some other implementations, the notification can be generated by the screenshot linking system 203 executing on the server 106 and transmitted to the client 102. The notification can alert a user of the client 102 that a link associated with the screenshot has been identified. The user of the client 102 can then select the link from within the notification to be directed to the resource associated with the link.

The process 260 includes providing, via the link, a page to purchase a product displayed in the image (step 270). In some implementations, the page may be provided by a web browser application executing on a computing device such as the client 102 shown in FIG. 2A. For example, as discussed above, the link may direct a user to a website operated by the company who produces the product. The user may then use the company's website to complete the purchase. In other implementations, the link can direct a user to a generic shopping interface or universal store that may not be associated with the company who produces the product. For example, the shopping interface may be provided by the operator of the screenshot linking system, or by a third party. The universal store can include an interface that allows the user to select various options related to the product, such as the desired size and color of the product. The interface for the universal store can be presented directly over other content that may be displayed on the client device, such as the image that is associated with the link. For example, the universal store interface can be overlaid with the image associated with the link, allowing the user to purchase a product shown in the image after selecting various options related to the product.

In some implementations, the universal store can include or can communicate with a database containing information relating to the products offered for sale through the universal store. For example, the screenshot linking application can communicate with the database to retrieve information about the product associated with a link that the user selected. The database can include information such as the manufacturer, the item name and serial number, the price of the item, and various selectable options associated with the item. The universal store interface can be overlaid on an image associated with the product, and can display information about the product obtained from the database. In some implementations, the universal store can include user interface elements that allow a user to select various options associated with the item, such as size and color.

The universal store can be independent of the web site associated with the manufacturer of the product that is offered for sale through the universal store. However, in some implementations, the user's interactions with the interface of the universal store may later be sent to a web site of the manufacturer of the product that is offered for sale through the universal store. For example, the user may purchase the product through the universal store interface, and information related to the sale, such as the size and color of the product, as well as shipping and billing information, can be sent to the manufacturer of the product that is offered for sale through the universal store. The process 260 includes receiving and executing a request to purchase the product (step 272). In some implementations, the request can be received by the screenshot linking application 215 executing on the client device 102. In some implementations, the page can include a checkout button that the user can select to complete the sale of the product to the user. For example, payment information, such as a credit card number and shipping address, can be stored in a user account of the user of the client 102. Selecting the checkout button can then cause the product to be billed to the credit card associated with the user account of the client 102, and can notify a retailer that the selected product should be sent to the shipping address associated with the user account of the client 102. In some other implementations, the shopping interface may prompt the user to enter payment information and a shipping address manually in response to the user selecting the checkout button.

C. Determining an Application Associated with a Screenshot

As discussed above, users of computing devices may wish to save images of content that interests them, such as from web pages on the Internet or screens of mobile applications, in the form of screenshots. A screenshot can be processed to generate a link to other relevant content. In some implementations, it may be useful to determine an application associated with a screenshot for purposes of generating such a link. For example, a deep link may be a link to a particular page or portion of a particular application, such as the application that was used to generate the screenshot. Therefore, for the screenshot linking system to generate a deep link, the screenshot linking system may identify the identity of the application active on the display of the client device at the time the screenshot was captured. Furthermore, the screenshot linking system may also be useful to process only a subset of the screenshots saved on a client device, such as screenshots that are generated by only a subset of applications. For example, some applications may be added to a white list of applications whose screenshots are to be processed and linked to other content. Screenshots associated with applications not included in the white list may not be processed in order to save computing resources.

One aspect of this disclosure can be implemented in a method or system for determining an identity of an application that is associated with a particular screenshot. The screenshot linking system can identify an image file and determine that the image file corresponds to a screenshot. The screenshot linking system can identify one or more visual elements of the screenshot. The screenshot linking system can then determine an identity of an application corresponding to the screenshot based on the identified visual elements.

Figure 3A:
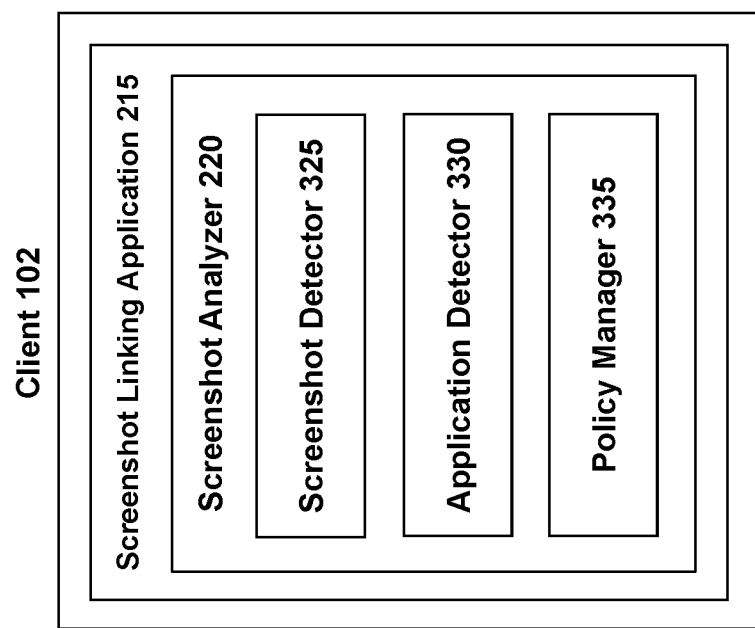
FIG. 3A is a block diagram depicting an embodiment of a screenshot analyzer that can be used in the system of FIG. 2A.

Referring now to FIG. 3A, a block diagram depicting an embodiment of a screenshot analyzer 220 that can be used in the system of FIG. 2A is shown. The screenshot analyzer 220 is shown as a component of the screenshot linking application 215, which executes on the client 102. However, in other implementations, the screenshot analyzer 220 can instead execute on the server 106. In brief overview, the screenshot analyzer 220 includes a screenshot detector 325, an application detector 330, and a policy manager 335.

The screenshot detector 325 can be configured to determine when a screenshot is captured on the client device 102.

As discussed above, in some implementations, screenshots can be saved to an image database such as the image database 210 shown in FIG. 2A. The screenshot detector 325 can continuously or periodically monitor the image database 210 to determine when new image files are added to the image database. In some implementations, the screenshot detector 325 can be further configured to determine whether a newly added image file corresponds to a screenshot or a different type of image file, for example based on the resolution of the newly added image file or metadata associated with the newly added image file. In some implementations, the screenshot detector 325 can determine if the image corresponds to a screenshot if the resolution of the screenshot is less than a predetermined resolution.

The application detector 330 can be configured to determine an application associated with a screenshot. In some implementations, the application detector 330 can be configured to determine one or more applications that were active on the client 102 when a particular screenshot was captured. In some other implementations, the application detector 330 can be configured to determine which application was used to display an image that is present within a screenshot. The determination can be made, for example, based on visual elements of the screenshot. In other implementations, the determination can be made based on other information, such as metadata associated with the screenshot.

In some implementations, the application detector 330 may include templates or image files of one or more applications. The application detector 330 can identify characteristics of the images of each of the applications to generate a list of characteristics unique to the particular application. For instance, each application may use a unique color scheme, font, layout, among others. In some implementations, the layout of the selectable icons may be unique in each of the applications. The application detector 330 can identify text in images by employing optical character recognition (OCR) techniques or other text recognition techniques. The application detector can then determine the application associated with the screenshot based on the identified text.

The application detector 330 can analyze or parse a screenshot and identify one or more characteristics of the image, including but not limited to the color scheme, layout, and arrangement of selectable icons, among others. The application detector 330 can then compare the identified characteristics with known characteristics unique to each of the one or more applications known to the application detector 330. The application detector 330 can then determine, based on the comparison of the characteristics of the screenshot, that the screenshot corresponds to one of the applications.

The policy manager 335 can store one or more policies related to processing of screenshots. For example, policies can include information related to processing of screenshots based on the applications that are associated with the screenshots. Each policy can include one or more rules. For example, the policy manager 335 can maintain a white list of applications. After the application detector 330 has determined an application associated with a screenshot, the application can be compared to the applications included in the white list maintained by the policy manager 335. In some implementations, if the application detector 330 determines that the application matches one of the applications included in the white list, the screenshot may be further processed to identify or generate a link associating the screenshot with another resource. However, if the application does not match one of the applications included in the white list, the screenshot may be discarded without further processing.

The policy manager 335 also can implement other application-based policies. For example, the policy manager 335 can assign higher priority to screenshots associated with particular applications, such that those screenshots are processed more quickly than screenshots associated with lower priority applications. In some implementations, the policy manager 335 can store information relating to various visual elements that are associated with particular applications. Such information can serve as reference information for the application detector 330 when determining which application a particular screenshot corresponds to.

In some implementations, the policy manager 335 can implement policies that control the timing of image processing or notifications. For example, the policy manager 335 can control the frequency with which the image database is scanned for new image files. Thus, the image database can be scanned for new files once every week, once every day, once every hour, or at any other interval according to a policy implemented by the policy manager 335. In some implementations, the policy manager 335 can cause an image to be processed after a predetermined interval has passed since the most recent image has been added to the image database. In some implementations, the policy manager 335 can cause images to be processed together in batches, for example after a predetermined number of new images have been added to the image database.

In some implementations, the policy manager 335 can implement policies to control other aspects of the screenshot linking system. For example, the policy manager 335 can control the timing with which notifications are displayed on the client 102. In some implementations, a user of the client can interact with the policy manager 335 to customize the parameters associated with various policies.

Figure 3B:
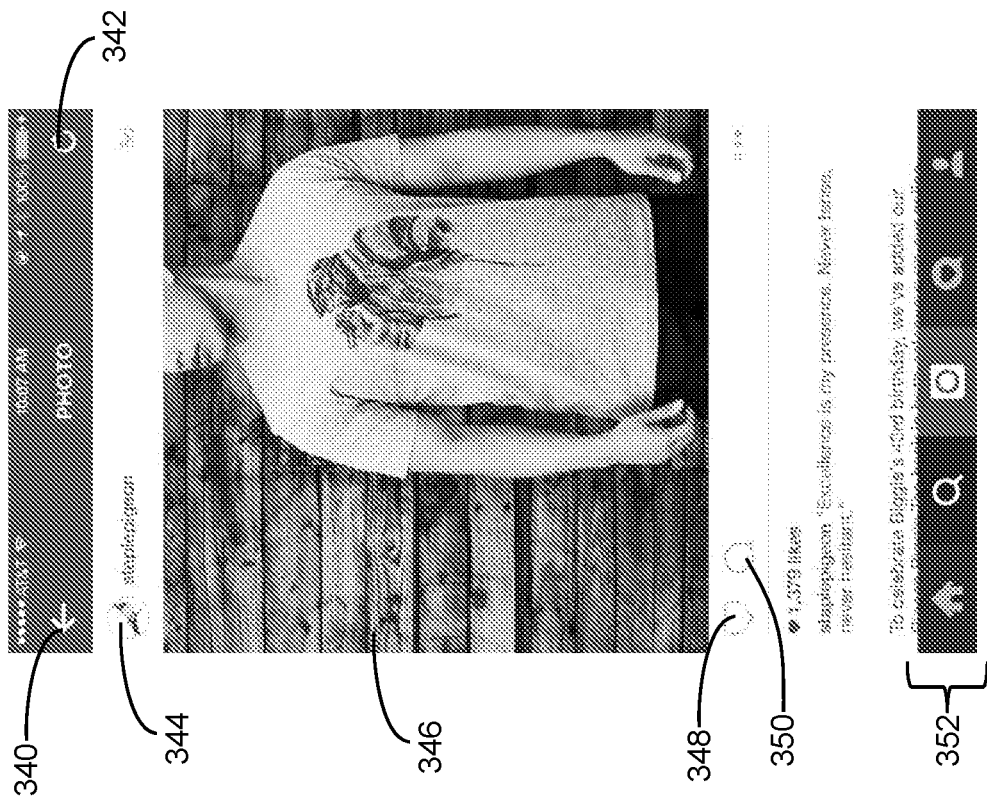
FIG. 3B is an example screenshot including an image.

FIG. 3B is an example screenshot including an image 346. The presence of the screenshot on the client device can be detected by the screenshot detector 325, as discussed above. After the screenshot has been detected, the application detector 330 can analyze the screenshot to determine an application associated with the screenshot. In some implementations, the application detector 330 identifies and analyzes visual elements of the screenshot to determine an application associated with the screenshot. Visual elements may include colors, shapes, icons, words, font styles, layouts, or any other visual features of the screenshot. For example, the screenshot shown in FIG. 3B includes a back button 340 and a refresh button 342 at the top of the screenshot, an account name 344, an image 346, a favorite button 348, a comment button 350, and various user interface elements 352.

The application detector 330 can process the screenshot to identify the visual elements, and can identify an application associated with the screenshot based on the identified visual elements. In some implementations, the application detector 330 compares the visual elements identified in the screenshot to reference information stored by the policy manager 335. For example, the policy manager 335 may store information about particular colors or font styles used in a certain application. If the application detector 330 determines that the colors or font styles of a screenshot match those associated with a particular application, the application detector 330 can determine that the screenshot is associated with that application. This processing technique can be efficient because, in many cases, applications executing on the client 102 have distinctive interface designs that may correspond to various visual elements. In some other implementations, the application detector 330 can use metadata of a screenshot to determine an application associated with the screenshot. For example, metadata may include text-based information indicating the application that was active on the client when the screenshot was captured.

Figure 3C:
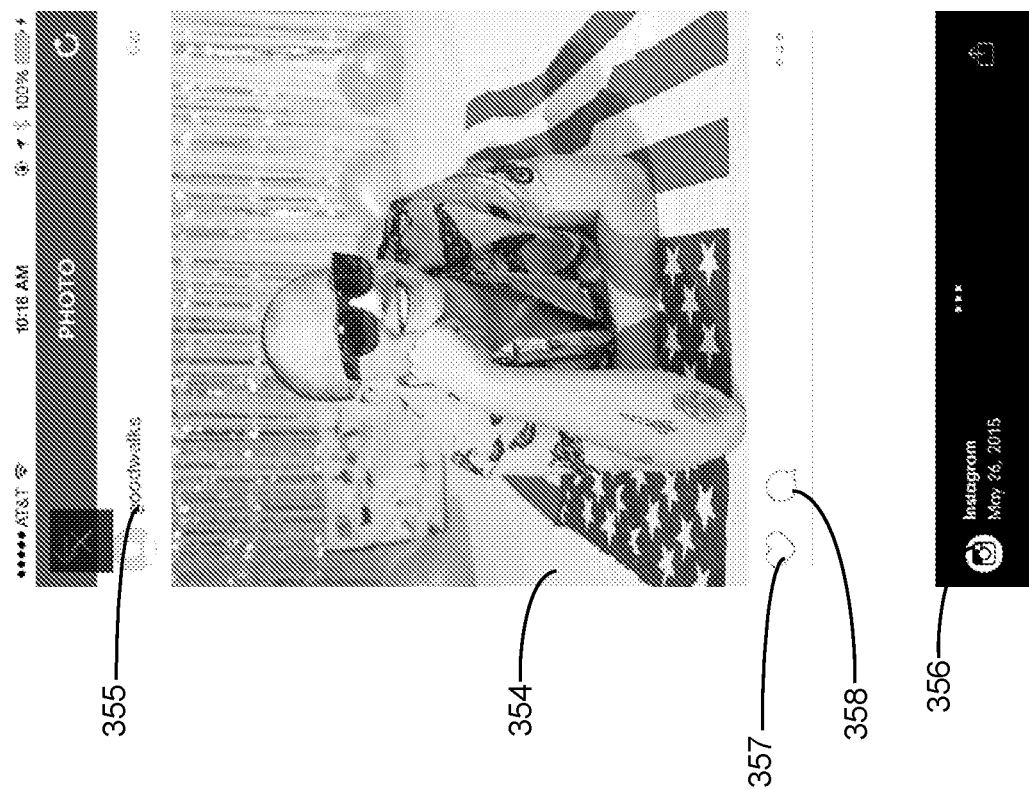
FIG. 3C is an example graphical user interface indicating an application associated with a screenshot.

FIG. 3C is an example graphical user interface indicating an application associated with a screenshot. In some implementations, the screenshot linking application 215 can cause the graphical user interface shown in FIG. 3C to be displayed on the client 102 in response to determining an application associated with a particular screenshot. The graphical user interface includes an image 354 and an application identification 356. The image 354 can correspond to an image that was present in the screenshot that has been analyzed by the application detector 330. In some other implementations, the graphical user interface shown in FIG. 3C can include the entire screenshot, including the image 354 and other visual elements present in the screenshot. The application identification 356 includes the name of the application associated with the screenshot (in this example, the associated application is Instagram), as well as a time stamp showing the day on which the screenshot was captured. Thus, the graphical user interface shown in FIG. 3C can be used to remind a user of the application used to capture a particular screenshot, as well as the time at which the screenshot was captured.

In some implementations, the graphical user interface shown in FIG. 3C also can include other information or other interface elements. For example, the graphical user interface can include a link to a profile page associated with the content publisher who provided the image shown in the screenshot. In some implementations, the screenshot linking application can scan the screenshot for text associated with the name of the content publisher who provided an image featured in the screenshot, for example using optical character recognition. If such text is shown in the screenshot, the graphical user interface can include a link that is selectable by a user of the client 102. Thus, as shown in FIG. 3C, the text 355, which includes a name of a content publisher, can be a selectable link in the graphical user interface. Selecting the link can direct the user to a web page associated with the content publisher. In some other implementations, the graphical user interface can include other links. For example, the user interface elements 357 and 358, which are shown in the application from which the screenshot was captured, may be associated with links in the graphical user interface shown in FIG. 3C. The links can, in some implementations, direct the user to the application associated with the screenshot and cause the application to perform the action associated with the user interface elements 357 and 358, such as "liking" or commenting on the post from which the screenshot was captured.

Figure 3D:
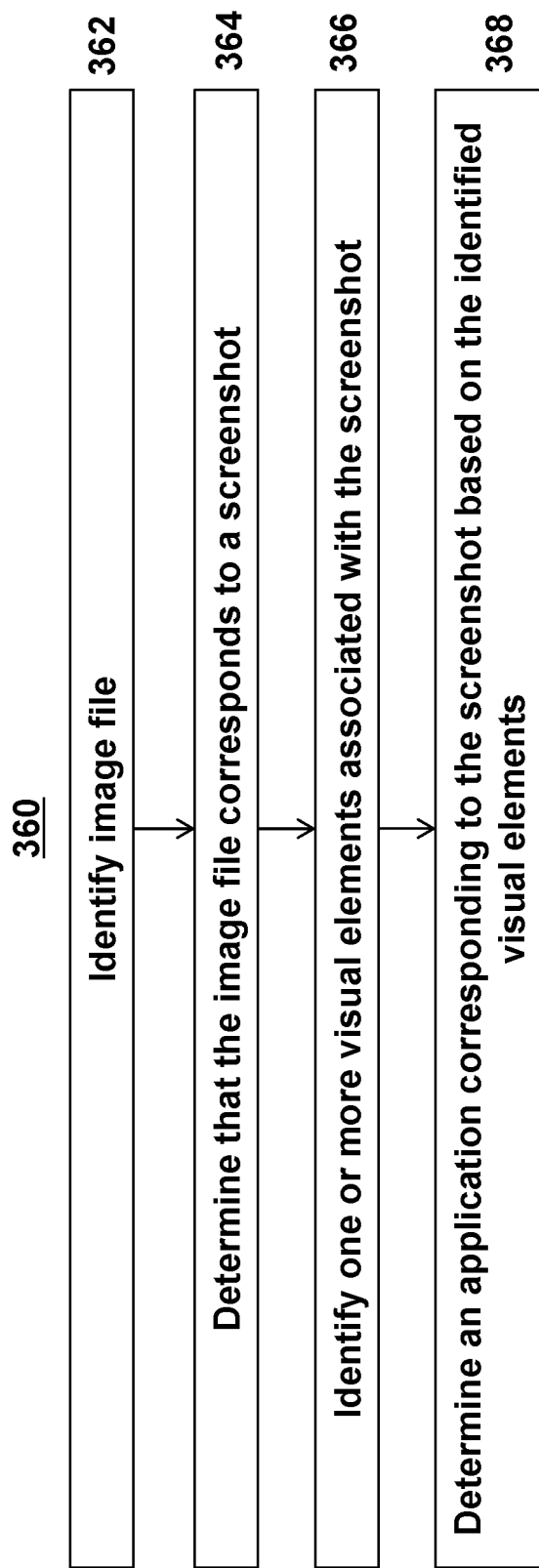
FIG. 3D is flow chart of a process for determining an application associated with a screenshot.

FIG. 3D is flow chart of a process 360 for determining an application associated with a screenshot. In brief overview, the screenshot linking application can identify an image file (step 362). The screenshot linking application can determine that the image file corresponds to a screenshot (step 364). The screenshot linking application can identify one or more visual elements of the screenshot (step 366). The screenshot linking application can determine an application corresponding to the screenshot based on the identified visual elements (step 368).

Referring again to FIG. 3D, the process 360 can include identifying an image file (step 362). In some implementations, the screenshot linking application can identify the image file. For example, the screenshot linking application can identify image files by monitoring a file directory in which image files are saved, such as the image database 210 shown in FIG. 2A. The screenshot linking application can then retrieve Image files from such a directory. The process 360 includes determining that the image file corresponds to a screenshot. In some implementations, the determination can be made by the screenshot detector 325, as described above. For example, the screenshot analyzer 325 can monitor the image database 210 to determine when new image files are added to the image database. In some implementations, the screenshot detector 325 can be further configured to determine whether an image file corresponds to a screenshot or a different type of image file, for example based on the resolution of the image file or metadata associated with the image file.

The process 360 includes identifying one or more visual elements associated with the screenshot (step 366). In some implementations, a screenshot analyzer can be used to identify the one or more visual elements. Visual elements may include colors, shapes, icons, words, font styles, layouts, or any other visual features of the screenshot. In some implementations, the application detector 330 may include templates or image files of one or more applications. The application detector 330 can identify characteristics of the images of each of the applications to generate a list of characteristics unique to the particular application. For instance, each application may use a unique color scheme, font, layout, among others. In some implementations, the layout of the selectable icons may be unique in each of the applications.

The process 360 includes determining an application corresponding to the screenshot based on the identified visual elements (step 368). In some implementations, an application detector can determine the application corresponding to the screenshot. In some implementations, the visual elements identified in the screenshot can be compared to reference information relating to visual elements associated with various applications. For example, the policy manager 335 may store information about particular colors or font styles used in a certain application. If it is determined that the colors or font styles of a screenshot match those associated with a particular application, it can also be determined that the screenshot is associated with that application.

D. Analyzing an Image Included within a Screenshot

As discussed above, a screenshot may capture the graphical content displayed on a display screen of a client device. However, some of the visual elements of the screenshot may be irrelevant, such as elements of a user interface of the active application or other information that may be displayed on a client device, such as the time, date, and battery level of the client device. Therefore, it can be useful to separate the relevant content of a screenshot, such as an image provided by a content publisher, from the less relevant content that may be included within the screenshot. After an image has been identified and/or extracted, the image may be processed to determine a watermark or fingerprint associated with the image. Watermarks and fingerprints can be used to match the images with reference images provided by content publishers. In this way, if a user takes a screenshot of an image that matches a reference image of a content publisher, the screenshot linking system can provide the user, via the device of the user, a notification that includes a link to content corresponding to the reference image that matched the image of the screenshot. As a result, content publishers or advertisers can provide relevant content to users based on screenshots captured by the users.

One aspect of this disclosure can be implemented in a method or system for analyzing an image included within a screenshot. An image can be identified and/or extracted from a screenshot. A watermark of the image can be identified. The watermark can include additional information corresponding to the image. In some implementations, the watermark can include data representing a link to a page of a mobile application or web server that includes content associated with the image. The link can be a link to content of a product shown in the image. In some implementations, the link can be a link to content of an advertiser or entity that published or provided the image. In some implementations, responsive to identifying the link to content, the screenshot linking system can provide a notification to the client device including the link to content to allow the user of the client device to retrieve additional information relating to the image included in the screenshot.

Another aspect of this disclosure also can be implemented in a method for analyzing an image included within a screenshot. An image can be identified and/or extracted from a screenshot. The screenshot linking system or a mobile application corresponding to the screenshot linking system can generate a fingerprint of the image can be generated. The screenshot linking system can then identify a fingerprint of a reference image that matches the fingerprint of the image of the screenshot. The screenshot linking system, responsive to determining that the fingerprint of the image of the screenshot matches the identified fingerprint of the reference image, can identify a link to content associated with the image. The screenshot linking system can then generate and provide a notification including the link to the user of the device. In this way, the screenshot linking system can provide the user relevant content based on images included in screenshots captured by the user. As a result, advertisers or content publishers can send links relevant to the user to increase user engagement.

Figure 4A:
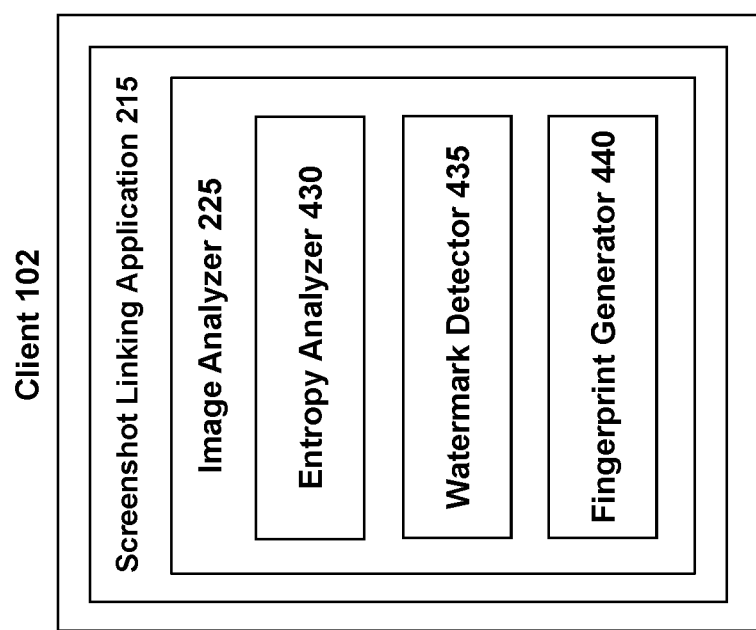
FIG. 4A is a block diagram depicting an embodiment of an image analyzer that can be used in the system of FIG. 2A.

Referring now to FIG. 4A, a block diagram depicting an embodiment of an image analyzer 225 that can be used in the system 201 of FIG. 2A is shown. The image analyzer 225 is shown as a component of the screenshot linking application 215, which executes on the client 102. However, in other implementations, the image analyzer 225 can instead execute on the server 106, also shown in FIG. 2A. In brief overview, the image analyzer 225 includes an entropy analyzer 430, a watermark detector 435, and a fingerprint generator 440.

The entropy analyzer 430 can be used to identify and/or extract an image from a screenshot. For example, as discussed above, screenshots may contain images as well as other visual elements that are associated with the application used to generate the screenshot. However, the user is typically more interested in the content of the image than the other visual elements that may be included within the screenshot. Furthermore, links to other content are based on the image data, and in some implementation should be independent of other visual elements not included in the image. Therefore, it can be helpful to extract an image from or identify an image within a screenshot. In some implementations, the entropy analyzer 430 can determine image entropy across the screenshot to determine which portions of the screenshot correspond to an image. In some implementations, the entropy analyzer 430 can scan the screenshot for noise that has been introduced during the watermarking process, as described further below. If such noise is present, the entropy analyzer 430 can determine that the screenshot includes a watermarked image.

Image entropy can refer to the amount of randomness associated with image data. Thus, an image having many different values for pixel color and pixel brightness across the image can have higher entropy than an image having relatively few different values for pixel color and pixel brightness across the image. Often, application interfaces include visual elements that are relatively simple in design. For example, an application may contain a large title bar or button that is a single color, and therefore the portion of a screenshot corresponding to such a visual element can have relatively low entropy. In contrast, photos often include pixels of many different colors and brightness levels, which can result in relatively high image entropy. The position of a title bar or other user elements can also provide information regarding which application was active in the display when a particular screenshot was captured.

Thus, in some implementations, the entropy analyzer 430 can determine the entropy associated with various regions of a screenshot, and can predict which regions correspond to an image based on the entropy values. In some implementations, the entropy analyzer 430 can segment a screenshot into blocks having a predetermined size. Image entropy for each block can be determined, and the likely edges of an image can be inferred based on changes in entropy from block to block. In some implementations, blocks may be combined into larger regions whose entropy can be determined by the entropy analyzer 430 in a subsequent round of testing.

In some implementations, the entropy analyzer 430 can determine entropy by applying a function to the distribution of pixel values across the screenshot. For example, in some implementations, the distribution of pixel values can be represented by a histogram. In some implementations, a logarithmic function can be applied to the distribution of pixel values (e.g., the histogram of the screenshot) to determine entropy. The entropy analyzer 430 can utilize histogram information to determine whether an image includes certain colors that may be associated with particular applications.

In some implementations, the entropy analyzer 430 or the image analyzer can be configured to identify one or more text characters displayed within the image. By identifying text characters in the image, the image analyzer can identify a brand associated with the image or other information that can be used to identify a reference image, or used by the screenshot linking system to identify a product associated with the image.

The watermark detector 435 can be configured to detect the presence of a watermark in an image extracted from a screenshot. As explained in greater detail below, a watermark may in some implementations be implemented as a visual or non-visual marker. Thus, in some implementations, the watermark detector 435 may be referred to as a marker detector. A watermark can be any information configured to uniquely identify an image. The watermark may identify, include or embed a GUID. In some implementations, a watermark may be a visual marker added to an image, such as a QR code or bar code. For example, a watermark may include any type or form of code, such as a string of characters, or a set of images such as emoticons. In some implementations, a watermark may include one or more strings of alphanumeric characters together with emoticons or other images. Some watermarks may include a predetermined character or symbol string at the beginning or end of the watermark, and may be preceded or followed by strings of other characters or images that are unique to each watermark. For example, all watermarks may begin with a common set of one or more characters or symbols, and may be followed by additional characters or symbols that are unique to their respective watermarks. In some implementations, a watermark may be a visual marker associated with an image but not included directly in the image. For example, the watermark may be displayed in an area surrounding a perimeter of the image. In one such example, the watermark may be included within a heading, a caption, or a comment of the image. Such a watermark may include characters, symbols, or emoticons that are created using a keyboard interface to enter information into a text field associated with the heading, caption, or comment of the image.

In some other implementations, a watermark can include metadata associated with an image. In still other implementations, a watermark can be encoded within data corresponding to the image. For example, a watermark can be generated using an encoding algorithm. The algorithm can be performed on an initial image I to create a watermarked image I' that is encoded with a message m. In some implementations, the message m can be a 128-bit message. The algorithm can be selected such that watermarked image I' is imperceptibly different from the initial image I. In some implementations, uniform random noise in [−3, 3] can be added to the initial image I. The initial image I, which may be an image in the RGB color space, can then be converted to the $YC_bC_r$ color space. Both of the chrominance channels in the converted image can be resized to 512×512. Thus, each chrominance channel can be divided into 4,096 blocks each having a size of 8×8. Next, a discreet cosine transform can be applied to each of the 8×8 blocks in I to create $I_{DCT}$. The message m is encoded in each chrominance channel 32 times according to a mapping, $1 \leq M(i,j) \leq 4096 \in \mathbb{Z}$, which takes the $i^{th}$ bit of the $j^{th}$ redundancy and maps to the block in $I_{DCT}$ in which to encode the bit. Let $B_{i,j}=I_{DCT}(M(i,j))$ be a block that is to be encoded with the $i^{th}$ bit of m. It can be ensured that $$\left\lfloor \frac{Bi, j(1, 1)}{10} \right\rfloor$$

is odd if $m_i=1$, and is even otherwise. Then, $I_{DCT}$ can be converted using the inverse discrete cosine transform, and the resulting image I can be resealed to the dimensions of the original image to generate the encoded image I' can then be converted back to the RGB color space. Thus, I' is an image in the RGB color space that is visually indistinguishable from I, but which includes the encoded message tn. Other algorithms also can be used to encode a watermark message in an image.

In some implementations, a watermark can be added to an image by the company, organization, or person who publishes the image. In some implementations, the watermark may be added to the image before the image is published. For example, the company, organization, or person who publishes the image may first alter or modify data corresponding to the image to include the watermark, prior to publishing the image including the watermark. In some other implementations, the watermark can be created after the image has been published. For example, the company, organization, or person who publishes the image may edit the image to include a watermark after the image has been published or otherwise made available for viewing by others. In another example, the watermark may be created by a third party who was not involved in the publishing of the image. As discussed above, a watermark may be included in a comment or caption associated with the image. Typically, comments and captions may be created after an image has been published. Thus, a third party may post a comment or caption including a watermark associated with an image after the image has been published.

The watermark can include information identifying the image as well as information relating to a link associated with the image. Including such information directly within a watermark can allow a link associated with the image to be easily identified, because it may not be necessary to compare the image or the watermark to a reference image or a reference watermark. In other implementations, a set of reference watermarks (which also may be referred to as reference markers) may be stored, and each reference watermark may be associated with a respective link. The watermark detector 435 can scan, monitor, parse or otherwise analyze the image, or an area of the screenshot surrounding a perimeter of the image, for a known pattern of information corresponding to a watermark format. For example, the watermark detector 435 can scan the image or the peripheral area of the screenshot surrounding the image for a particular visual marker, such as a code including a string of characters, symbols, emoticons, or other information. In another example, the watermark detector 435 can scan the image for a particular bit pattern in the image data itself in order to extract the watermark from the image. After the watermark detector 435 determines that a watermark is present in an image, the watermark can be compared to the set of reference watermarks. If a match is found, the link corresponding to the matching reference watermark can be identified (for example, by the screenshot linking system) as a link associated with the watermark of the image.

The fingerprint generator 440 can be configured to generate a fingerprint based on an image. A fingerprint can include any information uniquely identifying an image. A fingerprint may identify, include or embed a GUID. The fingerprint function may be designed and configured to generate and/or identify a GUID. In some implementations, a fingerprint may not be included within an image. Instead, the fingerprint generator 440 may process the image data to generate a fingerprint. In some implementations, the fingerprint can be generated by performing a hashing function on the image data associated with an image. For example, because images that differ from one another are represented by unique image data, the fingerprints representing a hash of the image data associated with unique images also should be unique. Furthermore, in some implementations, a fingerprint can be a string of bits uniquely representing the image from which the fingerprint was generated.

In some implementations, the publisher account manager 226 shown in FIG. 2A can collect images published by a company and can store the images in the database 232 of the server 106, also shown in FIG. 2A. The images can be processed to generate a reference fingerprint for each image, and a link can be associated with each reference fingerprint. When the fingerprint generator 440 processes an image on the client 102 to generate a fingerprint, the fingerprint can be transmitted to the server 106 and can be compared to the reference fingerprints stored in the database 232. If the server determines that there is a match, the server can associate a link corresponding to the matched reference fingerprint with the image.

Figure 4B:
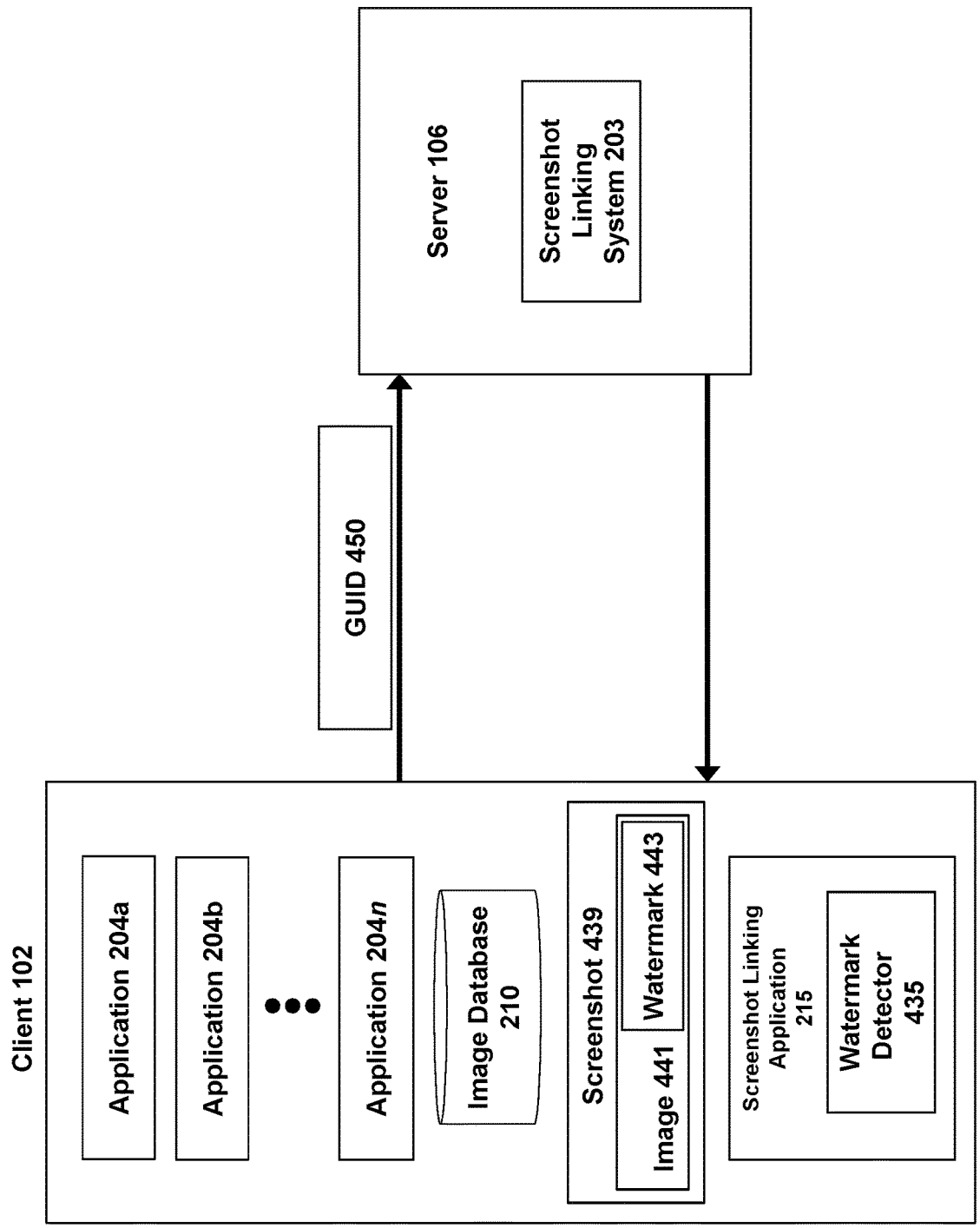
FIG. 4B is a conceptual diagram depicting an example use case for the system of FIG. 2A.

FIG. 4B is a conceptual diagram depicting an example use case for the system of FIG. 2A. As discussed above, the client 102 includes a plurality of applications 204, an image database 210, and the screenshot linking application 215.

The screenshot linking application 215 includes the watermark detector 435. In this example, the client 102 also includes a screenshot 439. The screenshot 439 includes an image 441, which includes a watermark 443. In some implementations, the screenshot 439 can be stored in the image database 210.

The entropy analyzer 430 can be used to identify and/or extract the image 441 from the screenshot 439, as described in detail above. After the image 441 has been extracted from the screenshot 439, the screenshot linking application can provide the image 441 to the watermark detector 435. The watermark detector 435 can process the image 441 to extract the watermark 443. As discussed above, in some implementations, the watermark can provide information relating to a link to be associated with the image. Therefore, in this implementation, the link can be determined before any communication is sent from the client 102 to the server 106. In some implementations, a globally unique identifier (GUID) associated with the image, such as the GUID 450, may be sent to the server 106. For example, the GUID 450 can be stored in the screenshot linking system 203 so that the screenshot linking system 203 can maintain a record of the images that have been viewed on the client 102. In some implementations, the GUID 450 can be stored in the database 232 by the user account manager 224 shown in FIG. 2A.

Figure 4C:
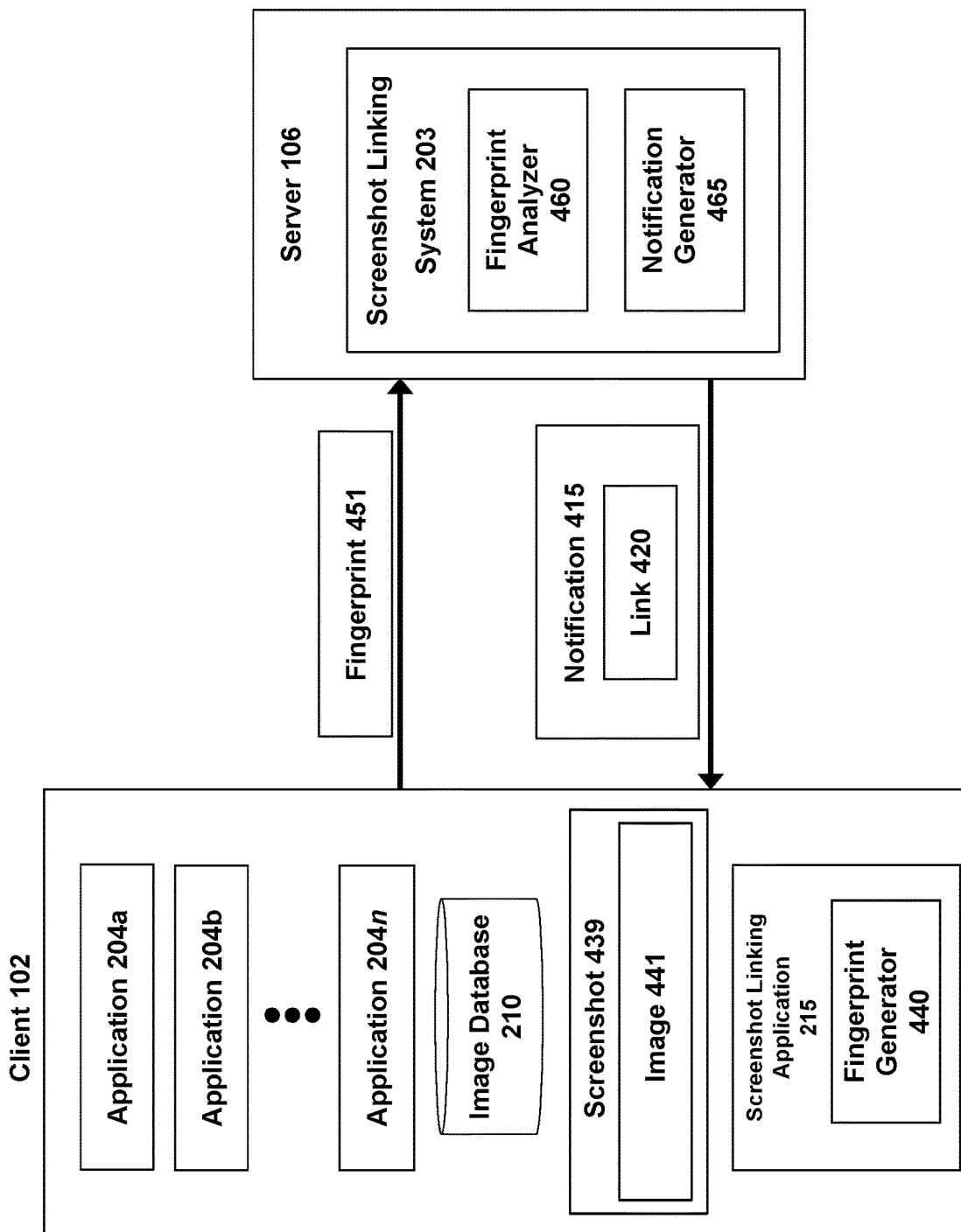
FIG. 4C is a conceptual diagram depicting an example use case for the system of FIG. 2A.

FIG. 4C is a conceptual diagram depicting an example use case for the system of FIG. 2A. This example is similar to the example shown in FIG. 4B, except that the screenshot 439 includes an image 441 without any watermark. In some implementations, the screenshot 439 can be stored in the image database 210. The screenshot linking system 203 also includes a fingerprint analyzer 460 and a notification generator 465.

The entropy analyzer 430 can be used to extract the image 441 from the screenshot 439, as described in detail above. After the image 441 has been extracted from the screenshot 439, the image 441 can be provided to the fingerprint generator 440. The fingerprint generator 440 can process the image 441 to generate a fingerprint 451 associated with the image. For example, the fingerprint generator 440 can perform a hashing function on the data representing the image 441 to determine a fingerprint 451 associated with the image 441. In some implementations, the fingerprint 451 associated with the image may be sent to the server 106. For example, the fingerprint 451 can be stored in the screenshot linking system 203. As discussed above, the server 106 can maintain a database of reference fingerprints and associated links. The fingerprint analyzer 460 can compare the fingerprint 451 to the reference fingerprints. If a match is determined, the link 420 corresponding to the matched reference fingerprint can be associated with the image. The notification generator 465 can generate a notification 415 which includes the link 420. The notification can then be transmitted back to the client 102, so that a user of the client 102 can access the link 420.

In some implementations, reference images can be retrieved from social media websites on which content publishers promote products. For example, the posts of a particular company can be scanned on a social media site and fingerprints can be generated for each image. The image and the generated fingerprints can then be saved and can then serve as reference images. Thus, reference fingerprints can be generated retroactively, after images have been published by a company.

Figure 4D:
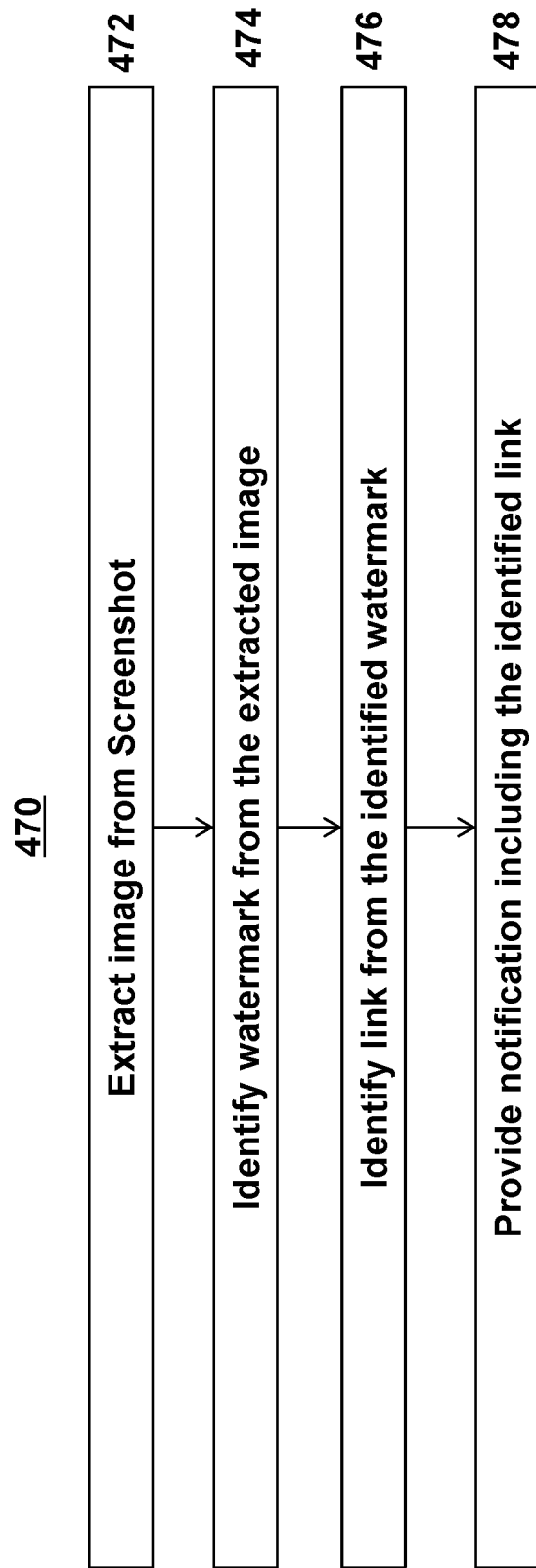
FIG. 4D is a flow chart of a process for analyzing an image including a watermark.

FIG. 4D is a flow chart of a process 470 for analyzing an image including a watermark. In brief overview an image can be extracted from a screenshot (step 472). A watermark can be identified from the extracted image (step 474). A link can be identified from the identified watermark (step 476). A notification can be provided including the link (step 478).

Referring again to FIG. 4D, and in greater detail, the process 470 can include extracting an image from a screenshot (step 472). In some implementations, an image analyzer such as the image analyzer 225 shown in FIG. 4A can be used to extract the image. For example, as discussed above, a screenshot may contain images as well as other visual elements that are associated with the application used to generate the screenshot. In some implementations, the entropy analyzer 430 can determine image entropy across the screenshot to determine which portions of the screenshot correspond to an image. For example, the entropy of the screenshot can provide information relating to the position of an image within the screenshot, thereby allowing the image to be extracted from the screenshot. In some implementations, extracting the image from the screenshot comprises generating a separate image file representing the image that has been extracted from the screenshot.

The process 470 can include identifying a watermark from the extracted image (step 474). In some implementations, the watermark can be extracted by a watermark detector such as the watermark detector 435 shown in FIG. 4A. In some implementations, the watermark can be any information configured to uniquely identify an image. In some implementations, a watermark may be a visual marker added to an image, such as a QR code or bar code. The watermark also may be or may include any other form of visual code, such as a string of character, or a set of images such as emoticons. In some implementations, watermarks may include a predetermined character or symbol string at the beginning or end of the watermark, and may be preceded or followed by strings of other characters or images that are unique to each watermark. For example, all watermarks may begin with a common set of two or more characters or symbols, and may be followed by additional characters or symbols that are unique to their respective watermarks. In such an example, the watermark may be identified by a watermark detector such as the watermark detector 435 shown in FIG. 4A by scanning the image for the predetermined set of characters or symbols. After the set of characters or symbols is located, the watermark detector may also determine the additional characters or symbols that follow or precede the predetermined set of characters as included in the watermark. In some implementations, a watermark may include a first set of characters or symbols which may be referred to as a prefix, and a second set of characters or symbols which may be referred to as a suffix. The prefix may be common to a plurality of watermarks associated with different images. That is, the prefix of two or more distinct watermarks may be identical. In contrast, the suffix may be unique in each watermarked image. For example, watermarks may include six characters in total, with the first two characters corresponding to the common prefix and the last four characters corresponding to the unique suffix. Thus, one watermark could be represented by the set of characters "*&1234," where "*&" is the prefix and "1234" is the suffix. A second watermark associated with a different image could be represented by the set of characters "*&5678," where the prefix is again "*&," as it was in the first watermark, but the suffix "5678" of the second watermark is different from the suffix of the first watermark. Because the prefix may be common across a plurality of watermarks, the watermark detector may first scan an image to locate the common prefix. After the common prefix has been identified, the watermark detector may be further configured to scan the remaining four characters to determine the unique suffix of the identified watermark. In some implementations, the watermark detector can include image processing functionality such as optical character recognition, to allow the watermark to be located in the image (or around a perimeter of the image). It will be appreciated by one of ordinary skill in the art that the example discussed above is illustrative only, and that the principles of the above example may be applied to many variations of types and forms of watermarks without departing from the scope of this disclosure. For example, in some implementations the prefix or suffix may have different lengths than those discussed above. In addition, in some implementations the suffix may be common across a plurality of images while the prefix is unique to each different image. Furthermore, in some implementations the set of characters used to form the prefix and suffix may be different than those of the example above. For example, in some implementations the prefix and the suffix may each contain any combination of letters, numbers, special characters, symbols, emoji, icons, or other forms of graphical content.

In some implementations, a watermark may be a visual marker associated with an image but not included directly in the image. For example, the watermark may be displayed in an area surrounding a perimeter of the image. In such example, the watermark may be included within a heading, a caption, or a comment of the image. Thus, the watermark detector may scan the image as well as an area surrounding a perimeter of the image to locate a watermark that may include characters, symbols, or emoticons in a heading, caption, or comment of the image.

In some other implementations, a watermark or marker of an image may not be visible to a viewer of the image. For example, a watermark can include metadata associated with an image but not impacting the appearance of the image. In another example, a watermark can be encoded within data corresponding to the image. For example, the least significant bits of each pixel in the image can be used to store information corresponding to a watermark of the image. Thus, data corresponding to the watermark or marker may change the appearance of the image only slightly, but would not be apparent to a human viewing the image on a display device. In implementations in which the watermark is not a visual marker, such as those described above, the watermark may include a code embedded in the image data or in metadata associated with the image. For example, the code may be a binary code, and may include error-checking bits. In some implementations, the watermark detector may read the code and translate the code into another format, such as a human readable string of characters that may correspond to the watermark. The watermark detector can scan the image for a known pattern of information corresponding to the watermark format. For example, the watermark detector can scan the image for a particular visual marker or a particular bit pattern in the image data itself in order to identify the watermark from the extracted image.

The process 470 can include identifying a link from the identified watermark (step 476). In some implementations, the link can be identified by a screenshot linking application executing on a client device or by a screenshot linking system remote from the client device. In some implementations, a watermark can be added to an image by the company who publishes the image. The watermark can include information identifying the image as well as information relating to a link associated with the image. Thus, in some implementations, a link associated with the image can be easily identified without comparing the image or the watermark to a reference image or a reference watermark. In other implementations, a set of reference watermarks may be stored, and each reference watermark may be associated with a respective link. The identified watermark can be compared to the set of reference watermarks. If a match is found, the link corresponding to the matching reference watermark can be identified as a link associated with the identified watermark. In some implementations, the link can be a URL or a "deep link" to a particular post within another application that executes on the client device.

The process 470 can include providing a notification including the identified link (step 478). In some implementations, the notification can be generated on the client device itself. In some other implementations, the notification can be generated remotely by a screenshot linking system and provided to the client device via a communication interface. The notification can then be displayed to a user of the client device, who can select the link included in the notification in order to view other content associated with the image corresponding to the link. In some implementations, the notification can be displayed on the client over the active application on the client. For example, if a screenshot is taken while a particular application is active on the client, the screenshot may be processed as discussed above and the notification can be displayed over the active application. In some implementations, the notification can be a popup notification. The notification may include text notifying a user of the client that a link associated with the most recently captured screenshot has been identified. In some implementations, the link may be displayed in the notification. In some other implementations, a user can select the notification to be directed to a different page or application in which the associated link is displayed.

Figure 4E:
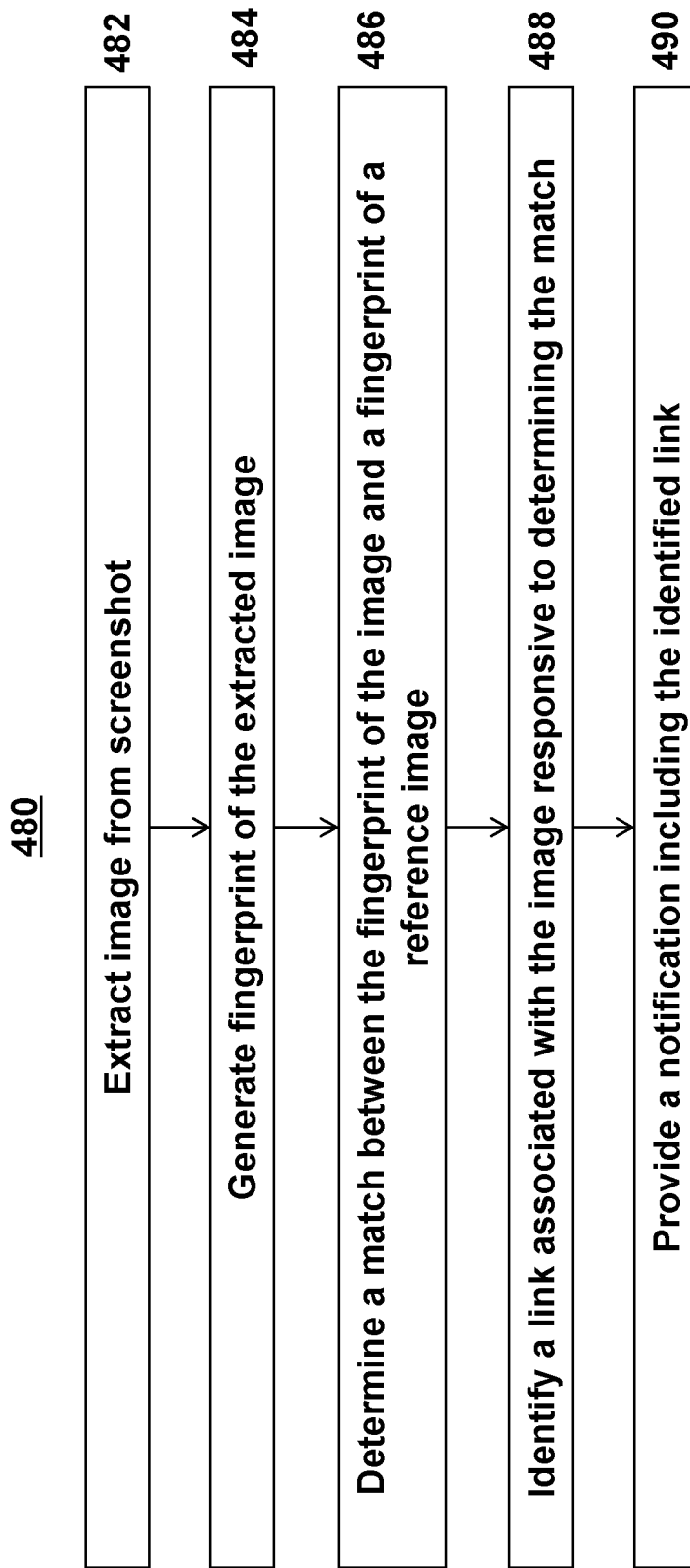
FIG. 4E is a flow chart of a process for analyzing an image based on a fingerprint of the image.

FIG. 4E is a flow chart of a process 480 for analyzing an image based on a fingerprint of the image. In brief overview, the process 480 can include extracting an image from a screenshot (step 482). A fingerprint of the identified and/or extracted image can be generated (step 484). A match can be determined between the fingerprint of the image and a fingerprint of a reference image (step 486). A link associated with the image can be identified, responsive to determining the match (step 488). A notification including the link can be provided (step 490).

Referring again to FIG. 4E, the process 480 can include identifying within and/or extracting an image from a screenshot (step 482). For example, as discussed above, a screenshot may contain images as well as other visual elements that are associated with the application used to generate the screenshot. In some implementations, an image analyzer such as the image analyzer 225 shown in FIG. 4A can identify or extract the image from the screenshot. In some implementations, the entropy analyzer 430 can determine image entropy across the screenshot to determine which portions of the screenshot correspond to an image. For example, the entropy of the screenshot can provide information relating to the position of an image within the screenshot, thereby allowing the image to be extracted from the screenshot. In some implementations, extracting the image from the screenshot comprises generating a separate image file representing the image that has been extracted from the screenshot.

The process 480 can include generating a fingerprint of the extracted image (step 484). In some implementations, the fingerprint can be generated by a fingerprint generator such as the fingerprint generator 440 shown in FIG. 4A. A fingerprint can include any information uniquely identifying an image. In some implementations, the fingerprint can be generated by performing a hashing function on the image data associated with an image. In some implementations, a fingerprint can be a string of bits uniquely representing the image from which the fingerprint was generated.

The process 480 can include determining a match between the fingerprint of the image and a fingerprint of a reference image (step 486). In some implementations, the match may be determined by a screenshot linking application such as the screenshot linking application 215 executing on the client 102 as shown in FIG. 4B. In some other implementations, the match may be determined by a remote screenshot linking system such as the screenshot linking system 203 shown in FIG. 4B. In some implementations, images published by a company can be stored in the database. The images can be processed to generate a reference fingerprint for each image, and a link can be associated with each reference fingerprint. When a fingerprint is generated for the extracted image, the fingerprint can be compared to the reference fingerprints.

The process 480 can include identifying a link associated with the image response to determining a match (step 488). In some implementations, the link can be identified by a screenshot linking application executing on a client device or by a screenshot linking system remote from the client device. In some implementations, links corresponding to reference images can be stored in a database. Because the fingerprint match determined in step 486 ensures that the image is the same as a reference image, the link associated with the matched reference image also should be associated with the original image.

The process 480 can include providing a notification including the identified link (step 490). In some other implementations, the notification can be generated remotely by a screenshot linking system and provided to the client device via a communication interface. In some implementations, the notification can be generated on the client device itself. The notification can then be displayed to a user of the client device, who can select the link included in the notification in order to view other content associated with the image corresponding to the link.

Figure 4F:
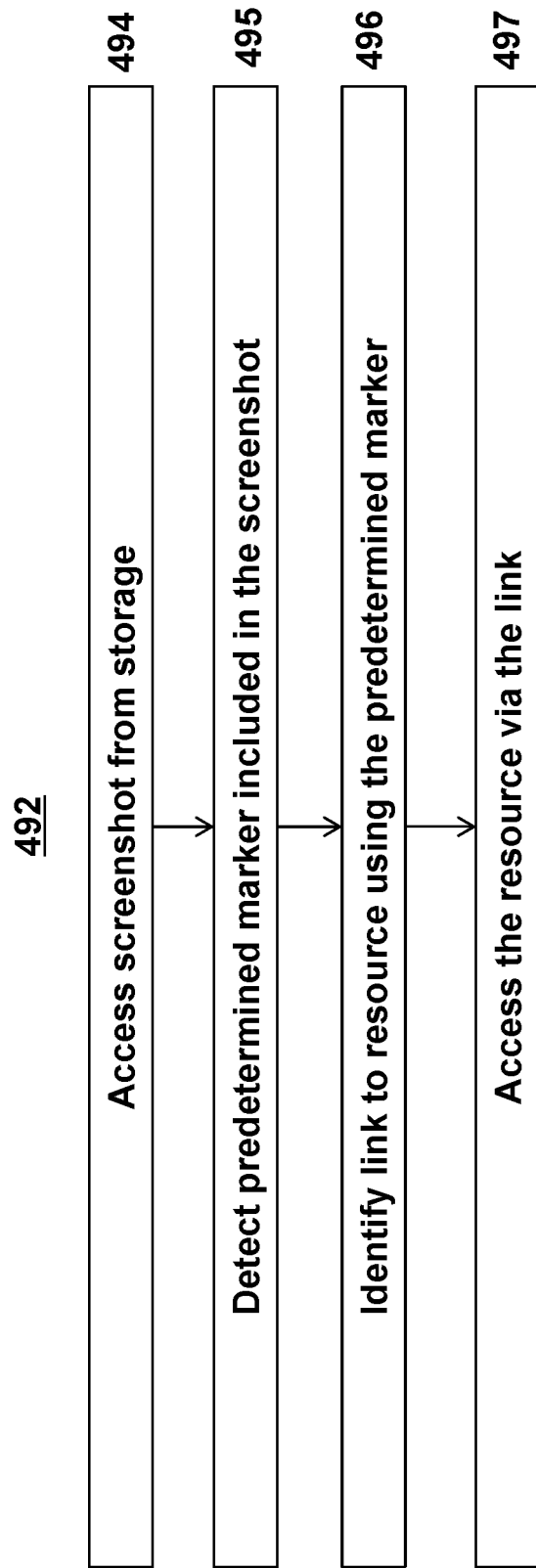
FIG. 4F is a flow chart of a process for analyzing screenshots to identify links to resources.

Referring now to FIG. 4F, FIG. 4F is a flow chart of a process 492 for analyzing an screenshot including an image and a predetermined marker to access a resource. In brief overview, a screenshot is accessed from storage (step 494). A predetermined marker included in the screenshot is then detected (step 495). A link to a resource can be identified from the identified predetermined marker (step 496). The resource is then accessed via the link (step 497).

In further detail, the process 492 can include accessing a screenshot from storage (step 494). In some implementations, a screenshot linking application executing on a client device can access screenshots from a storage of the client device. The storage can be shared across multiple applications executing on the client device. The storage can be a memory of the client device or any other type of storage component of the client device. the client device can include one or more computer-executable instructions, which when executed on the client device, cause the client device to take a screenshot of the content displayed on a screen of the client device. In some implementations, a screenshot capturing function of the client device can capture the screenshot. In some implementations, the client device can capture a screenshot responsive to receiving predetermined input commands on the client device. In some implementations, the screenshot can include an image and a predetermined marker. The image can be an image uploaded to a web resource by a third-party, such as an advertiser, a retailer, or a user. The image can be an image uploaded onto a social media website. In some implementations, the screenshot can also include other areas of the web resource that surround the image or are otherwise adjacent to the image. In some implementations, the other areas of the web resource can include text characters, icons, visual symbols, icons, or other graphical components, which can be used by the screenshot linking system. In some implementations, the party uploading the image can upload the image with a predetermined marker that is detectable by the screenshot linking application. In some implementations, the image can be embedded with the predetermined marker in such a way that the screenshot linking application can detect the marker. In some implementations, the image can be embedded with the predetermined marker in such a way that the screenshot linking application can visually detect the marker using image analysis. In some implementations, the predetermined marker includes a visual marker added to the image that is included in the screenshot prior to the screenshot being captured by the client device.

The process 492 can include detecting a predetermined marker included in the screenshot (step 495). In some implementations, the screenshot linking application can detect the predetermined marker included in the screenshot by extracting the image from the screenshot and then identifying the marker from the extracted image (step 474). In some implementations, the marker can be extracted or otherwise identified by a watermark detector such as the watermark detector 435 shown in FIG. 4A. In some implementations, the marker can be any information configured to uniquely identify the image included in the screenshot. In some implementations, the marker may be a visual marker added to an image, such as a QR code or bar code. The marker also may be or may include any other form of visual code, such as a string of character, or a set of images such as emoticons. In some implementations, markers may include a predetermined character or symbol string at the beginning or end of the marker, and may be preceded or followed by strings of other characters or images that are unique to each marker. For example, all markers may begin with a common set of two or more characters or symbols, and may be followed by additional characters or symbols that are unique to their respective markers. In such an example, the marker may be identified by scanning the image or the screenshot for the predetermined set of characters or symbols.

The process 492 can include identifying a link to a resource from the identified predetermined marker (step 496). In some implementations, the link to the resource can be identified by the screenshot linking application executing on the client device or by a screenshot linking system remote from the client device. In some implementations, the screenshot linking application or the screenshot linking system can maintain a plurality of reference markers. The screenshot linking application or the screenshot linking system can maintain a plurality of reference markers in a marker database that maps the reference markers to at least one resource. In some implementations, the database can include a mapping of each reference image to a link to a resource. In this way, when the predetermined marker is identified from the screenshot, the screenshot linking application executing on the client device or the screenshot linking system can determine a match between the predetermined marker and one of the plurality of reference markers stored in the marker database. The screenshot linking application or the screenshot linking system can analyze the predetermined marker to generate a hash of the image or some other computed value and compare the hash or computed value of the predetermined marker to computed values of the reference markers. If a match between the computed value of the predetermined marker and one of the reference markers is found, the screenshot linking application or the screenshot linking system determines that the predetermined marker matches a reference marker. The screenshot linking application or the screenshot linking system can then identify a link or URL to a resource to which the matched reference marker is mapped in the marker database. In some implementations, the link can be a URL or a "deep link" to a particular post within another application that executes on the client device. The screenshot linking application or the screenshot linking system can then select the link to the resource that is mapped to the matched reference marker.

The process 492 can include accessing the resource via the link (step 497). In some implementations. The client device can access the resource via the link responsive to the screenshot linking application identifying the link and sending instructions to the client device (or an application executing on the client device) to access the resource via the link. In some implementations, the link can be a URL to a resource in which case, the screenshot linking application can generate a request to cause a browser on the client device to access the resource via the URL. In some implementations the link can be a deep link to a specific application executing on the client device. In some such implementations, the screenshot linking application can generate a request to access the resource to which the link is mapped via the specific application. In some implementations, the screenshot linking application can generate an actionable object that is displayed on the client device. The actionable object can be configured to cause the client device to access the resource to which the link is mapped responsive to the user of client device taking an action on the actionable object. Examples of actions can include a click, tap, or any other input that can be received by the client device.

E. Providing a Product Recommendation to a User

Users who capture screenshots depicting particular types of products may not be interested in other unrelated types of products. However, products similar to those that are depicted in the screenshots that a user captures may be of more interest to the user. As a result, the user may be more likely to purchase a product that is similar to the products depicted in the screenshots captured by the user. In some implementations, the screenshots and purchasing decisions of the user, as well as those of other users, can form the basis for a product recommendation for the user.

One aspect of this disclosure can be implemented in a method for providing a product recommendation to a user. To provide recommendation to one or more users, the screenshot linking system can build one or more recommendation engines. The recommendation engines can rely on models that process input data to generate output data in the form of recommendations. The input data can be referred to as training data that is provided to the recommendation engine to train the model. The models can be adaptive and continually learning.

In some implementations, the recommendation engine can be configured to determine recommendations for a user based on a user's screenshots. The recommendation engine can determine recommendations of products that are similar to products identified in the user's screenshots. In some implementations, the recommendation engine can rely on screenshots of other users that the recommendation engine determines are similar to screenshots captured by the user. In this way, the recommendation engine can generate product recommendations for the user based on screenshots and images included in the screenshots captured by the other users of the screenshot linking system.

In some implementations, the recommendation engine can be configured to identify users that are similar to one another based on the screenshots captured by each of the users. In this way, the recommendation engine can recommend products in which users similar to the user have expressed an interest. Similarly, advertisers or other content providers may choose to generate marketing or advertising campaigns directed towards users that are similar to one another and that are likely interested in the products of the advertisers. The recommendation engine can be configured to generate a mode to identify users similar to one another based on the screenshots of each of the users.

The screenshot linking system, by analyzing screenshots of a particular user, can gain intelligence relating to the user. To gain intelligence relating to the user, the screenshot linking system can scan the image database including the screenshots captured by the device of the user. In some implementations, the screenshot linking system can scan the image database to identify data, including but not limited to, data indicating the dates and time the screenshot was captured, the number of screenshots captured, the frequency with which screenshots have been captured, and any geographical location information associated with the screenshots, among others.

As described above, the screenshot linking system can analyze the screenshots to identify the identity of applications active on the device when the screenshots were captured as well as information included in images included in the screenshots. Based on the applications identified via the screenshots, the screenshot linking system can determine a manifestation of activity of applications. That is, the screenshot linking system can identify the types of applications the user engages with, the frequency of engagement, among others. In some implementations, the screenshot linking system can determine, from the applications identified via the screenshots, activity of the user with the identified applications.

The screenshot linking system can further monitor activity performed by the user with one or more stores associated with the screenshot linking system. The screenshot linking system can identify the images included in the screenshots and based on the identified images, determine a user's purchasing intent. If the screenshot linking system determines that the user has captured a larger number of screenshots that include images of shoes, the screenshot linking system can determine that the user may have an intent to purchase shoes. This intent can be used to then provide recommendations to the user for additional content. Further, the intent can be used by the screenshot linking system to allow advertisers that sell shoes to target the user by providing relevant content related to shoes.

The screenshot linking system can be configured to identify brands associated with the images included in the screenshots. The screenshot linking system can also identify specific products included in the images. In some implementations, the screenshot linking system can identify the specific products and brands by matching the images with reference images, as described above. The screenshot linking system can further determine, based on the brands and products identified in the images, details relating the products, including the price thresholds of the products as well as the categories to which the products belong. For instance, the screenshot linking system may identify multiple images relating to shoes. The screenshot linking system can further determine specific shoes and using third-party data or information retrieved from a database mainlined by the screenshot linking system, prices of the shoes. Based on the prices of the shoes and the brands of the shoes, the screenshot linking system can learn about the user's preferences and shopping habits, as well as be able to learn about products that the user is or may be interested in.

The screenshot linking system can be configured to generate models to learn about users as well as to generate a recommendation engine. The screenshot linking system can generate user specific models specific to respective users. The model can be configured to determine the types of products a user may be interested in, the price range of the products, and the brands of the products, among others. In some implementations, the screenshot linking system can also generate brand-specific models specific to respective brands. The screenshot linking system can identify images corresponding to specific brands and identify users that captured screenshots of such images. The screenshot linking system can then generate a brand-specific model for a brand based on activities of users that captured screenshots of images related to the brand.

According to one aspect, a first plurality of user profiles can be generated for a plurality of users based on screenshots associated with the plurality of users. A plurality of categories to which the user profiles belong can be determined. Each user profile can be assigned to at least one of the plurality of categories. A recommendation model can be built for each category. A second user profile, not included in the first plurality of user profiles, can be identified. A category to which the second user profile should be assigned can be identified. A product recommendation can be provided to the second user based on the category to which the second user profile is assigned.

According to another aspect, the screenshot linking system can receive a plurality of screenshots captured by a device of a user. The screenshot linking system can identify images included in the screenshot. The screenshot linking system can, from the images, identify one or more categories to which the images correspond. In some implementations, the categories can be based on topics, such as clothing, furniture, and electronics, among others. In some implementations, the categories can be based on brands. In some implementations, the categories can be based on other attributes. Responsive to determining the categories that the screenshots belong, the screenshot linking system can generate a user profile based on the categories of the screenshots. The screenshot linking system, via a recommendation engine that uses data from a large number of users, can provide recommendations of products (or content in general) based on a comparison of the user's profile with user profiles of other users and the screenshots corresponding to the other users.

Figure 5A:
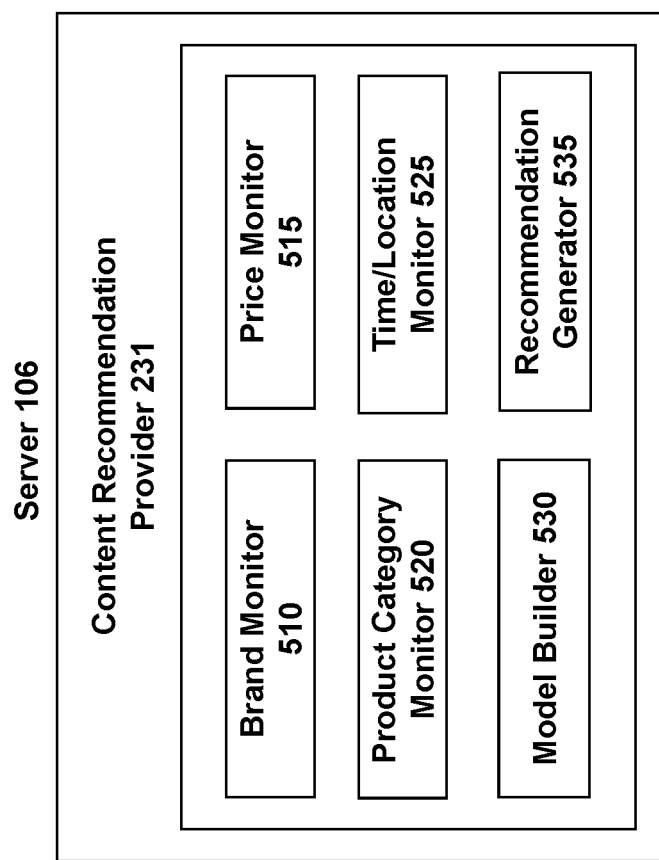
FIG. 5A is a block diagram depicting an embodiment of a content recommendation provider that can be used in the system of FIG. 2A.

Referring now to FIG. 5A, a block diagram depicting an embodiment of a content recommendation provider 231 that can be used in the system of FIG. 2A is shown. The content recommendation provider 231 is shown as executing on the server 106. However, in other implementations, the content recommendation provider 231 can instead execute on the client 102. In brief overview, content recommendation provider 231 includes a brand monitor 510, a price monitor 515, a product category monitor 520, a time/location monitor 525, a model builder 530, and a recommendation generator 535.

The brand monitor 510 can monitor and record information corresponding to brands associated with images of screenshots that are captured by users of various client devices, such as the client device 102. For example, the brand monitor 510 can determine a brand associated with a screenshot by referring to the company that published an image associated with the screenshot. The brand can be a brand corresponding to a product shown in an image within the screenshot. In some implementations, the content recommendation provider 231 can be notified whenever a client device, such as the client device 102, sends image data to be processed by the screenshot linking system 203. Image data can include a GUID of a watermark, a fingerprint, an image, or a screenshot. After the brand monitor 510 determines a brand associated with a screenshot, information corresponding to the brand can be stored in a user profile associated with the particular client device on which the screenshot was captured. In some implementations, the user account manager 224 shown in FIG. 2A can stored the brand information in the respective user profile on the server 106, for example in the database 232.

The price monitor 515 can monitor and record information corresponding to prices associated with images of screenshots that are captured by users of various client devices, such as the client device 102. For example, the price monitor 515 can determine a price associated with a product shown in a screenshot. In some implementations, the price monitor 515 can determine a price range associated with a screenshot. For example, the price range can be a range that includes the actual price of a product shown in the screenshot. In other implementations, the price monitor 515 can determine a specific price of a product in a screenshot. After the price monitor 515 determines a price associated with a screenshot, information corresponding to the price can be stored in a user profile associated with the particular client device on which the screenshot was captured. In some implementations, the user account manager 224 shown in FIG. 2A can stored the price information in the respective user profile on the server 106, for example in the database 232.

The product category monitor 520 can monitor and record information corresponding to product categories associated with images of screenshots that are captured by users of various client devices, such as the client device 102. For example, the product category monitor 520 can determine a product category associated with a product shown in a screenshot. In some implementations, the product category can be a broad category, such as "clothing." In other implementations, the product category can be a narrower category, such as "men's clothing" or "women's clothing." In some implementations, the product category monitor 520 can determine more than one category for a screenshot. After the product category monitor 520 determines a product category associated with a screenshot, information corresponding to the product category can be stored in a user profile associated with the particular client device on which the screenshot was captured. In some implementations, the user account manager 224 shown in FIG. 2A can stored the product category information in the respective user profile on the server 106, for example in the database 232.

The time/location monitor 520 can monitor and record information corresponding to times and/or locations associated with screenshots that are captured by users of various client devices, such as the client device 102. For example, the time/location monitor 520 can determine the time at which a particular screenshot was captured or the location in which the screenshot was captured. In some implementations, the time and location information can be determined based on metadata associated with a screenshot. For example, an image file corresponding to a screenshot may include a time stamp representing the time at which the image file was created. Similarly, an image file corresponding to a screenshot may include GPS information representing the approximate location of the client device at the time the image file was created. After the time/location monitor 520 determines time and location information associated with a screenshot, information corresponding to the time and location can be stored in a user profile associated with the particular client device on which the screenshot was captured. In some implementations, the user account manager 224 shown in FIG. 2A can stored the time and location information in the respective user profile on the server 106, for example in the database 232.

The model builder 530 can generate a model associated with various categories. Categories that can be modeled may include brands, prices, product categories, and geographic location categories. In some implementations, the model builder 530 can build a model based on information stored in the user profiles of a plurality of users. The model builder 530 can identify trends across users who capture screenshots of similar products. For example, the model builder 530 can determine popular products within a particular price range, popular products within a particular brand, brands that are popular relative to other brands, and popular product categories. In some implementations, the model builder 530 can generate a model based on more than one category. For example, the model builder 530 can determine that, among users who capture screenshots of products in a given price range, products from a certain brand are also particularly popular. In some implementations, the model builder 530 can build an individual model for each unique user whose client 102 device sends screenshots to the server 106. For example, the model for a user may be based in part on the products shown in screenshots of other users who appear to have similar product preferences. In some implementations, a model may include or may be based on a generic template. For example, a model template can include various attributes and values associated with those attributes. In some implementations, attributes can include brands, products, or product categories. Values for each attribute can indicate a weight to be assigned to that particular attribute. Thus, the generic model template can be customized according to the preferences of each user of a client device based on the screenshots captured on the individual client devices. For example, the values associated with attributes can be in increased responsive to determining that those attributes are more prevalent in the screenshots on a client device, and can be decreased responsive to determining that those attributes are less prevalent in the screenshots on a client device.

The recommendation generator 535 can recommend products to users of clients 102. In some implementations, the recommendation generator 535 can use the information provided by the model builder 530 to generate a recommendation. For example, the recommendation generator 535 can receive information from the model builder 530 corresponding to a product that is predicted to be of interest to a particular user, based on the model for that user. In some implementations, the recommendation generator 535 also can generate a notification including a recommendation and can send the notification to the respective client 102.

Figure 5B:
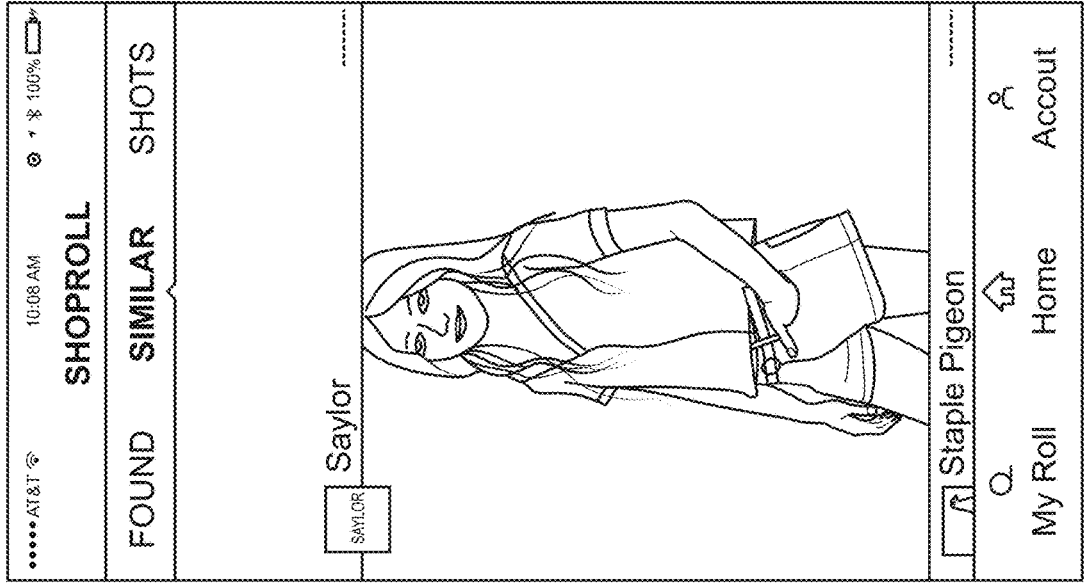
FIG. 5B is an example graphical user interface for displaying products found in the screenshots of a client device.

FIG. 5B is an example graphical user interface for displaying products found in the screenshots of a client device. The graphical user interface displays products based on the images extracted from screenshots, as discussed above. The user can select the "similar" button at the top of the graphical user interface shown in FIG. 5B to be directed to the graphical user interface shown in FIG. 5C.

Figure 5C:
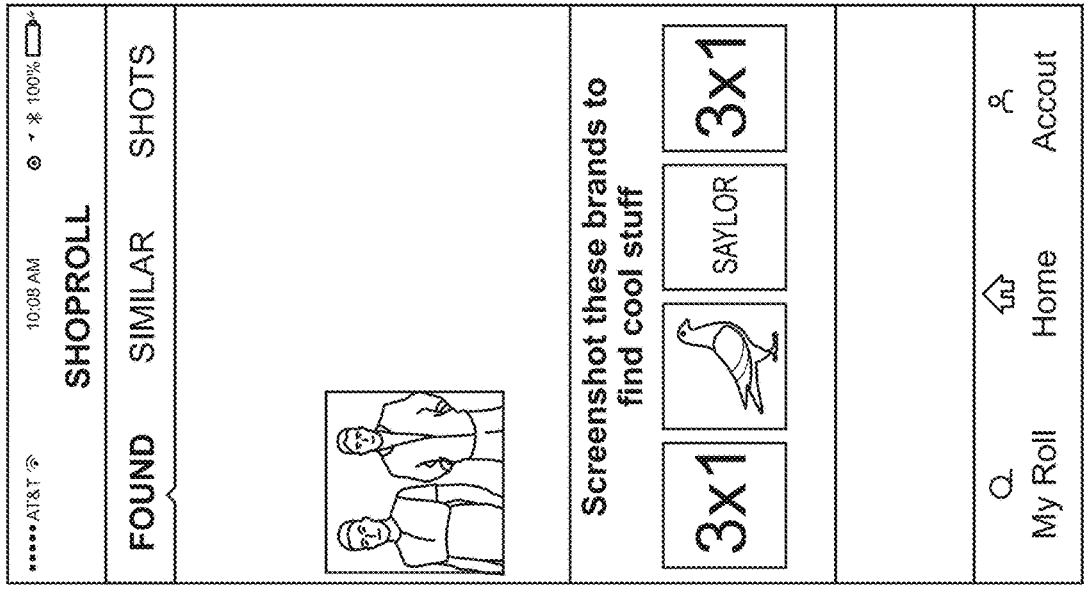
FIG. 5C is an example graphical user interface for displaying products similar to those that are found in the screenshots of a client device.
Figure 5D:
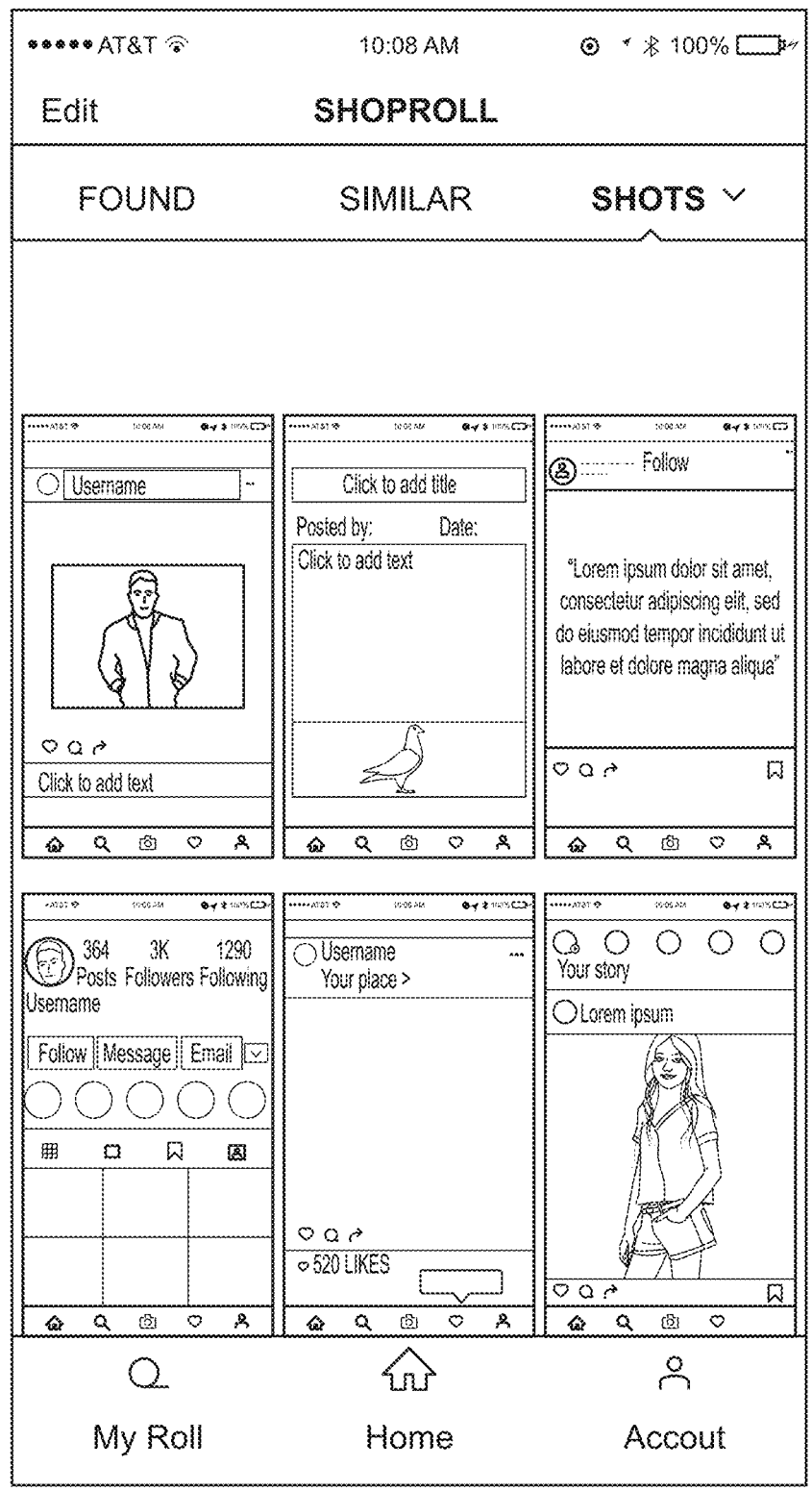
FIG. 5D is a graphical user interface for displaying the screenshots that are stored on a client device.

FIG. 5C is an example graphical user interface for displaying products similar to those that are found in the screenshots of a client device. In some implementations, the graphical user interface shown in FIG. 5C can show products selected based on a model associated with the user of the client device on which the graphical user interface is displayed. For example, similar products can be identified as products having similar prices, similar brands, or similar product categories with respect to the products shown in screenshots of the client device. Such information can be collected by the brand monitor 510, the price monitor 515, and the product category monitor 520, and modeled by the model builder 530, as discussed above. In some implementations, similar products can be identified by the recommendation generator 535 based on a model built by the model builder 530, and sent to the client device to be display in the graphical user interface of FIG. 5C. The user can select the "shots" button at the top of the graphical user interface shown in FIG. 5C to be directed to the graphical user interface shown in FIG. 5D. FIG. 5D is a graphical user interface for displaying the screenshots that are stored on a client device. In some implementations, the screenshots can be retrieved from a database, such as the image database 210 shown in FIG. 2A. In some implementations, products displayed in the graphical user interface shown in FIG. 5C can be identified by a recommendation engine, as described further below in connection with FIG. 5E.

Figure 5E:
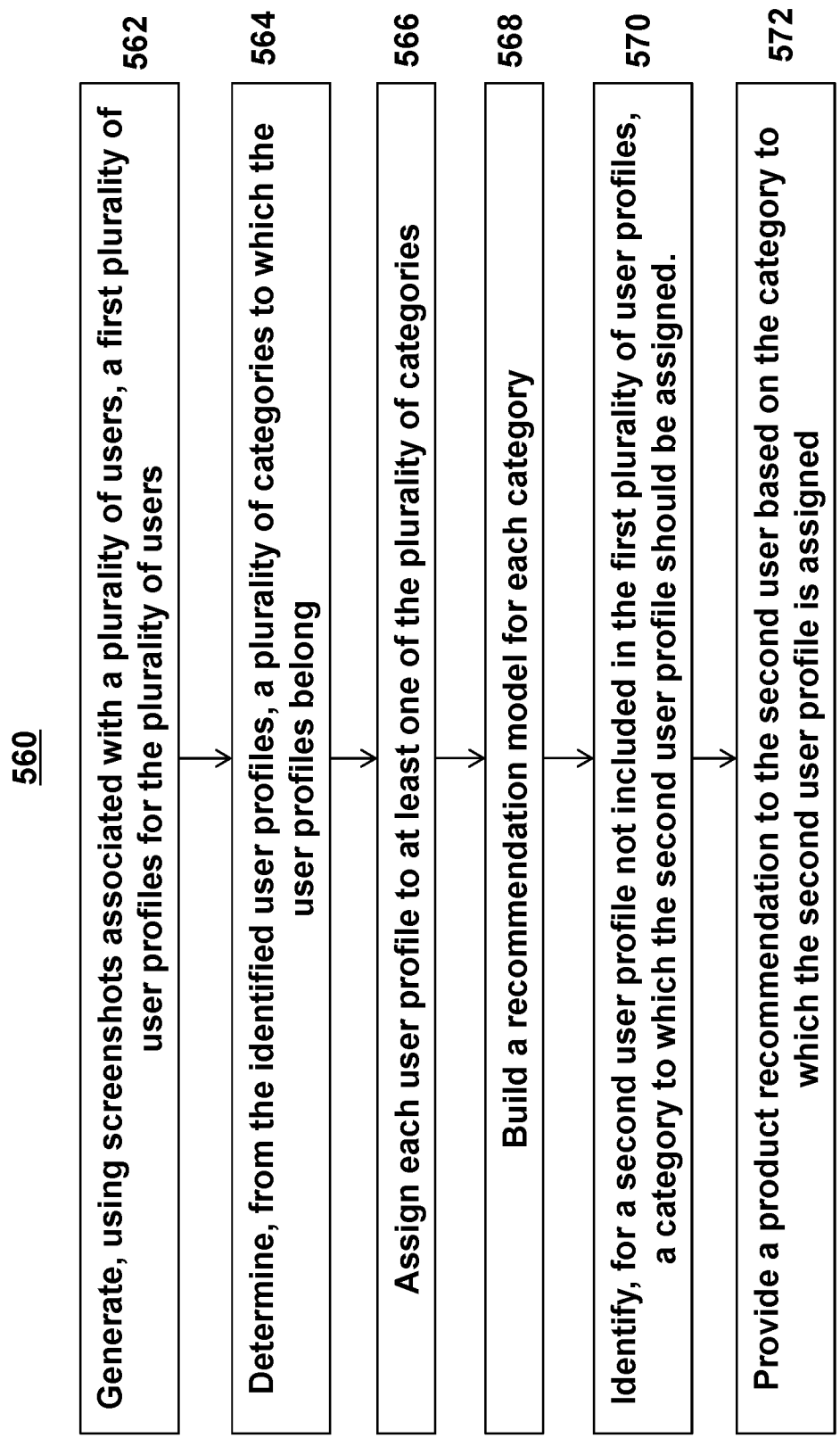
FIG. 5E is a flow chart of a method for providing a product recommendation to a user.

FIG. 5E is a flow chart of a process 560 for providing a product recommendation to a user. In brief overview, a first plurality of user profiles can be generated for a plurality of users based on screenshots associated with the plurality of users (step 562). A plurality of categories to which the user profiles belong can be determined (step 564). Each user profile can be assigned to at least one of the plurality of categories (step 566). A recommendation model can be built for each category (step 568). A second user profile, not included in the first plurality of user profiles, can be identified, and a category to which the second user profile should be assigned can be identified (step 570). A product recommendation can be provided to the second user based on the category to which the second user profile is assigned (step 572).

Referring again to FIG. 5E, the process 560 can include generating, using screenshots associated with a plurality of users, a first plurality of user profiles for the plurality of users (step 562). In some implementations, the user profiles can be generated by the user account manager 224 shown in FIG. 2A. For example, when screenshots or other image data is sent to a screenshot linking system, information relating to products shown in the screenshots can be stored in the user profiles of the users who generated the screenshots. In some implementations, the information can include information relating to brands, prices or price ranges, product categories, time stamps, and location data associated with products shown in screenshots. As a user continues to send additional image data to the screenshot linking system, the user profile for that user can be augmented to include additional product information based on the newly received screenshots.

The process 560 can include determining, from the identified user profiles, a plurality of categories to which the user profiles belong (step 564). In some implementations, the categories may be determined by the product category monitor 520 shown in FIG. 5A. Categories may include brands, prices, or product categories. Each user profile can be assigned to at least one of the plurality of categories (step 566). In some implementations, a user account manager can assign the user profiles to respective categories. In some implementations, a user profile can be assigned to a category based on the information in the user profile. For example, if a user profile indicates that the user often captures screenshots that show sneakers, the user profile can be added to a "sneakers" category. In some implementations, the user profile also can be added to other categories. The other categories may overlap with the first category, and may be broader or narrower than the first category. For example, a user profile that is added to a "sneakers" category also may be added to a broader "footwear" category. User profiles can also be added to other categories based on the brands and prices of products that appear in their screenshots.

The process 560 can include building a recommendation model for each category (step 568). In some implementations, a model builder can build the model for each category. For example, models can be built based on information stored in the user profiles of a plurality of users. The model builder can identify trends across users who capture screenshots that belong to a particular category. For example, the model builder can determine popular products within a particular price range, popular products within a particular brand, brands that are popular relative to other brands, and popular product categories. In some implementations, the model builder 530 can generate a model based on more than one category. For example, the model builder 530 can determine that, among users who are assigned to a particular price category, products from a certain brand are also particularly popular.

The model builder 530 can be configured to generate a model using a first set of known users. The model builder 530 may receive, as inputs, information associated with a plurality of users. The information can include the screenshots captured by each of the users, their demographic information, their preferences, likes and dislikes, and other data either inferred from the users or received from the users. In addition, the model builder may receive category information associated with each user. Category information can include information that categorizes the user in one or more categories, for instance, brands, type of clothing, type of fashion, among others. The model builder can then analyze each of the screenshots of each of the users to determine trends across each of the users based on their screenshots and their known categories, preferences, likes and dislikes.

The process 560 can include identifying, for a second user profile not included in the first plurality of user profiles, a category to which the second user profile should be assigned (step 570). In some implementations, the category for the second user may be determined by the product category monitor 520 shown in FIG. 5A. In some implementations, the category of the second user profile can be determined based on the products shown in screenshots that have been captured by the second user. For example, the screenshots of the second user can be analyzed to determine a category that the second user is likely to be interested in, and the second user can then be assigned to that category. In some implementations, the second user may be assigned to more than one category.

In some implementations, the model builder can identify the second user's screenshots and other profile information. Based on the images included in the screenshots and the profile information, the model builder can match the second user to one or more of the first users based on similarities of the images and the profile information. For instance, if the images in the screenshots of the second user are similar to images included in screenshots of a subset of the first plurality of users, the second user can be determined to be similar to that subset of the first plurality of users. In some implementations, the model builder can generate feature vectors for each of the users based on their preferences and information extracted from the images, and using algorithms, determine clusters of users based on distances of the feature vectors from one another.

The process 560 can include providing a product recommendation to the second user based on the category to which the second user profile is assigned (step 572). In some implementations, the product recommendation can be provided by the recommendation generator 535 shown in FIG. 5A. In some implementations, the product recommendation can be selected based on a model associated with the category to which the second user is assigned. For example, the second user can be assigned to an "athletic wear" category. The model for that category may indicate that users assigned to that category are often interested in particular brands, such as Nike. As a result, a recommendation for a Nike product may be provided to the second user, even if the second user has never captured a screenshot showing a Nike product. In some implementations, the recommendation can be provided on the client device of the second user through a graphical user interface similar to the graphical user interface discussed above in connection with FIG. 5C.

In other implementations, the screenshot linking system can receive a plurality of screenshots captured by a device of a user. The screenshot linking system can identify images included in the screenshots. The screenshot linking system can, from the images, identify one or more categories to which the images correspond. In some implementations, the categories can be based on topics, such as clothing, furniture, or electronics, among others. In some implementations, the categories can be based on brands. In some implementations, the categories can be based on other attributes. Responsive to determining the categories to which the screenshots belong, the screenshot linking system can generate a user profile based on the categories of the screenshots. The screenshot linking system, via the recommendation engine that uses data from a large number of users, can provide recommendations of products (or content in general) based on a comparison of the user's profile with user profiles of other users and the screenshots corresponding to the other users.

In some implementations, each image can be categorized with one or more tags. These tags can be provided based on information received from the publisher of the image. In some implementations, the tags can be generated using third-party sources. In some implementations, the tags can be generated from information received from users of the screenshot linking system. In some implementations, the screenshot linking system can analyze each of the images of a user and determine the tags or attributes associated with each of the images. The screenshot linking system can then generate a user profile based on the attributes. The user profile can be a multi-attribute vector that represents the user. The vector can then be used to categorize the user in one or more categories. In some implementations, the screenshot linking system can determine a strength of each attribute based on a number of times the attribute is tagged to the images included in the user's screenshots. Examples of attributes can include product items, product color, product shape, product price, product brand, among others. It should be appreciated that the images can include products corresponding to a wide variety of industries. Although the examples shown herein relate to clothing, the products can include furniture products, electronics, kitchenware, home goods, cars, among others. In addition, each of the different types of products may have different appropriate attributes. For instance, for cars, the type of car can be an SUV, van, sedan, or convertible, among others, while for furniture, the type of furniture can include a sofa, table, chair, dining table, or ottoman, among others. As such, attributes may vary based on the type of product identified in an image. As such, in some implementations, the recommendation engine may only generate recommendations for a user based on images corresponding to particular products, for instance, cars, furniture, clothing, or subsets of such product types.

In some implementations, the screenshot linking system may be able to determine a user's conversions responsive to links provided to the user. The conversions can influence the recommendation engine of the screenshot linking system as conversions can provide stronger signals of preference than screenshots. Using the vector representing the user, the recommendation engine can identify one or more products or content that the recommendation determines to be relevant to the user. The identified products or content are then provided to the user and responsive to the user's actions on the products or content, the recommendation engine can update the strengths of attributes of the user.

In some implementations, the screenshot linking system can determine trends based on multi-attribute vectors representing the users. For instance, if the multi-attribute vectors of many users indicate a strong attribute in a particular brand, the recommendation engine can determine that the particular brand is popular. Similarly, if the multi-attribute vectors of many users indicate a strong attribute in a particular color, the recommendation engine can determine that the particular color is popular. While the invention has been particularly shown and described with reference to specific embodiments, it should be understood by those skilled in the art that various changes in form and detail may be made therein without departing from the spirit and scope of the invention described in this disclosure.

In some implementations, the process 560 can include different or additional steps, and the steps shown in FIG. 5E also may be modified, in order to provide a product recommendation to a user. For example, in some implementations, the recommendation generator can use various machine learning techniques to provide a recommendation. In some implementations, the recommendation generator can adapt the models used to provide recommendations based on feedback from a user. Thus, subsequent recommendations to the user can be improved, based on the users responses to past recommendations (e.g., whether the user expressed interest or made purchases of products recommended in the past). In some implementations, the recommendation generator can provide personalized recommendations to a user by adjusting the models used to generate recommendations based on past behavior of the user.

What is claimed is:

1. A computer-implemented method for processing image data using at least one processor coupled to a memory, the method comprising:
   receiving, by the at least one processor, a set of image data generated from a display device at a client computing device associated with a user;
   determining, by the at least one processor, that the received set of image data represents a first screenshot based on metadata associated with the received set of image data;
   identifying, by the at least one processor, a first plurality of visual elements of the first screenshot;
   determining, by the at least one processor, first relevant content in the first screenshot based on the identified first plurality of visual elements;
   matching, by the at least one processor, the first relevant content in the first screenshot with first reference content;
   identifying, by the at least one processor, a first product category or a first product brand to which the first relevant content corresponds;
   determining, by the at least one processor, a first link associated with the first reference content;
   transmitting, by the at least one processor, the first link to the client computing device to enable the user to access the first link;
   generating, by the at least one processor, a user profile for the user to include data associated with the first relevant content in the first screenshot; and
   associating, by the at least one processor, the user profile with the identified first product category.

2. The method of claim 1, wherein the first relevant content is determined in the first screenshot using image processing techniques.

3. The method of claim 1, wherein the first link provided to the client computing device is a URL to a product webpage for purchasing a product identified in the screenshot.

4. The method of claim 1, wherein the first relevant content includes a marker configured to uniquely identify the first relevant content.

5. The method of claim 1, further comprising identifying at least one application associated with the first screenshot based on the identified first plurality of visual elements.

6. The method of claim 1, further comprising:
   monitoring, by the at least one processor, a database associated with the client computing device to determine when new sets of image data that correspond to screenshots are added to the database.

7. The method of claim 1, further comprising generating and transmitting a notification to the client computing device that the first link associated with the first screenshot has been determined.

8. The method of claim 1, wherein the first relevant content is an image in the first screenshot, and wherein matching the first relevant content in the first screenshot with the first reference content comprises:
   comparing the image to a plurality of reference images stored within the memory; and
   determining a match between the image and one of the plurality of reference images.

9. The method of claim 1, wherein the first link comprises a deep link corresponding to at least one of a particular webpage or a portion of a particular mobile application associated with the first screenshot.

10. The method of claim 1, further comprising:
    identifying, by the at least one processor, a second plurality of visual elements in a second screenshot;
    determining, by the at least one processor, second relevant content in the second screenshot based on the second plurality of visual elements;
    matching, by the at least one processor, the second relevant content in the second screenshot with a second reference content;
    identifying, by the at least one processor, a second product category to which the second relevant content in the second screenshot corresponds, wherein the second product category is the same as the first product category;

determining, by the at least one processor, a second link associated with the second reference content;

transmitting, by the at least one processor, the second link to the client computing device to enable the user to access the second link; and updating the user profile associated with the first product category to include data associated with the second relevant content in the second screenshot.

11. A system for analyzing image data comprising:
at least one processor; and
at least one storage device storing instructions which, when executed by the at least one processor, cause the at least one processor to perform operations comprising:

receiving a set of image data generated from a display device at a client computing device associated with a user;

determining that the received set of image data represents a first screenshot based on metadata associated with the received set of image data;

identifying a first plurality of visual elements of the first screenshot;

determining first relevant content in the first screenshot based on the identified first plurality of visual elements;

matching the first relevant content in the first screenshot with first reference content;

identifying a first product category or a first product brand to which the first relevant content corresponds;

determining a first link associated with the first reference content;

transmitting the first link to the client computing device to enable the user to access the first link;

generating, by the at least one processor, a user profile for the user to include data associated with the first relevant content in the first screenshot; and associating, by the at least one processor, the user profile with the identified first product category.

12. The system of claim 11, wherein the first relevant content is determined in the first screenshot using image processing techniques.

13. The system of claim 11, wherein the first relevant content includes a marker configured to uniquely identify the first relevant content.

14. The system of claim 11, wherein the operations further comprise monitoring a database associated with the client computing device to determine when new sets of image data are added to the database.

15. The system of claim 11, wherein the operations further comprise generating and transmitting a notification to the client computing device that the first link associated with the first screenshot has been determined.

16. The system of claim 11, wherein the first link comprises a deep link corresponding to at least one of a particular webpage or a portion of a particular mobile application associated with the first screenshot.

17. A non-transitory computer-readable medium storing computer-executable instructions which, when executed by at least one processor, cause the at least one processor to perform operations comprising:

receiving a set of image data generated from a display device at a client computing device associated with a user;

determining that the received set of image data represents a first screenshot based on metadata associated with the received set of image data;

identifying a first plurality of visual elements of the first screenshot;

determining first relevant content in the first screenshot based on the identified first plurality of visual elements;

matching the first relevant content in the first screenshot with first reference content;

identifying a first product category or a first product brand to which the first relevant content corresponds;

determining a first link associated with the first reference content;

transmitting the first link to the client computing device to enable the user to access the first link;

generating, by the at least one processor, a user profile for the user to include data associated with the first relevant content in the first screenshot; and associating, by the at least one processor, the user profile with the identified first product category.

18. The computer-readable medium of claim 17, wherein the first link provided to the client computing device is a URL to a product webpage for purchasing a product identified in the first screenshot.

19. The computer-readable medium of claim 17, wherein the first relevant content includes a marker configured to uniquely identify the first relevant content.

20. The computer-readable medium of claim 17, wherein the first link comprises a deep link corresponding to at least one of a particular webpage or a portion of a particular mobile application associated with the first screenshot.

* * * * *